United States Patent
Ueda et al.

(10) Patent No.: US 12,064,686 B2
(45) Date of Patent: Aug. 20, 2024

(54) INFORMATION PROCESSING SYSTEM AND INFORMATION PROCESSING METHOD

(71) Applicant: CYGAMES, INC., Tokyo (JP)

(72) Inventors: Keita Ueda, Tokyo (JP); Keisuke Kumagai, Tokyo (JP); Satoshi Hiroshima, Tokyo (JP)

(73) Assignee: CYGAMES, INC., Tokyo (JP)

( * ) Notice: Subject to any disclaimer, the term of this patent is extended or adjusted under 35 U.S.C. 154(b) by 234 days.

(21) Appl. No.: 17/487,837

(22) Filed: Sep. 28, 2021

(65) Prior Publication Data

US 2022/0016523 A1     Jan. 20, 2022

Related U.S. Application Data

(63) Continuation of application No. PCT/JP2020/015934, filed on Apr. 9, 2020.

(30) Foreign Application Priority Data

Apr. 12, 2019    (JP)  ................................. 2019-076094

(51) Int. Cl.
     *A63F 13/35*          (2014.01)
     *A63F 13/45*          (2014.01)
     (Continued)

(52) U.S. Cl.
     CPC .............. *A63F 13/35* (2014.09); *A63F 13/45* (2014.09); *A63F 13/533* (2014.09); *A63F 13/58* (2014.09);
     (Continued)

(58) Field of Classification Search
     CPC ........ A63F 13/35; A63F 13/45; A63F 13/533; A63F 13/58; A63F 13/822; A63F 2300/308; A63F 2300/807
     See application file for complete search history.

(56) References Cited

U.S. PATENT DOCUMENTS 6,836,785 B1 * 12/2004 Bakshi ................ H04L 49/9073
                                                709/224
6,884,169 B2 * 4/2005 Tsuchida ............... A63F 13/822
                                                 463/31

(Continued)

FOREIGN PATENT DOCUMENTS

JP          2016214639 A     12/2016

OTHER PUBLICATIONS

International Search Report issued in International Application No. PCT/JP2020/015934, mailed Jun. 9, 2020 (6 pages).

(Continued)

*Primary Examiner* — Steve Rowland
(74) *Attorney, Agent, or Firm* — Osha Bergman Watanabe & Burton LLP

(57) ABSTRACT

An information processing system comprises a player terminal and a server, wherein the player terminal is configured to execute: transmission processing for transmitting action identification information corresponding to a selected action to the server on the basis of an input of a selecting operation for selecting one of a plurality of actions, the server is configured to execute: update processing for updating a parameter at least on the basis of the received action identification information; and setting rendering information at least on the basis of the received action identification information, the player terminal is further configured to execute: displaying an action image on a display on the basis of the received rendering information; and setting a terminal-side wait period on the basis of an input of a specific operation, and the player terminal does not execute the transmission processing during the terminal-side wait period.

6 Claims, 23 Drawing Sheets

(51) Int. Cl.
*A63F 13/533* (2014.01)
*A63F 13/58* (2014.01)
*A63F 13/822* (2014.01)

(52) U.S. Cl.
CPC ....... *A63F 13/822* (2014.09); *A63F 2300/308* (2013.01); *A63F 2300/807* (2013.01)

(56) References Cited

U.S. PATENT DOCUMENTS

| | | | | |
|---|---|---|---|---|
| 9,009,253 | B2* | 4/2015 | Chandrasekhar ... | G06F 16/9574 709/217 |
| 2003/0002441 | A1* | 1/2003 | Banerjee ................ | H04L 45/00 370/230 |
| 2005/0267980 | A1* | 12/2005 | Warren .................. | H04L 51/23 709/232 |
| 2012/0106458 | A1* | 5/2012 | Jang ...................... | H04W 76/18 370/328 |
| 2012/0159267 | A1* | 6/2012 | Gyorffy .............. | G06F 11/0757 714/E11.024 |
| 2016/0175715 | A1* | 6/2016 | Ye .......................... | A63F 13/58 715/757 |
| 2018/0077063 | A1* | 3/2018 | Kurabayashi ......... | A63F 13/352 |
| 2020/0246697 | A1* | 8/2020 | Wang ................... | A63F 13/533 |
| 2020/0406139 | A1* | 12/2020 | Chino .................. | A63F 13/355 |
| 2023/0285846 | A1* | 9/2023 | Peretz .................... | A63F 9/18 345/156 |

OTHER PUBLICATIONS

Written Opinion issued in International Application No. PCT/JP2020/015934; Dated Jun. 9, 2020 (4 pages).

Office Action issued in Japanese Application No. 2019-076094; Dated Jun. 11, 2019 (5 pages).

* cited by examiner

INFORMATION PROCESSING SYSTEM AND INFORMATION PROCESSING METHOD

CROSS REFERENCE TO RELATED APPLICATIONS

This application is a continuation application of International Application No. PCT/JP2020/015934, filed on Apr. 9, 2020, which claims priority to Japanese Patent Application No. 2019-076094, filed on Apr. 12, 2019, the entire contents of which are incorporated by reference herein.

BACKGROUND ART

Technical Field

The present invention relates to information processing systems and information processing methods.

In a game described in Patent Literature 1, an action (request) selected by a player at a player terminal is reserved. After the elapse of a wait time, the reserved action is transmitted to a server. The wait time is set in consideration of the processing load at the server.

CITATION LIST

Patent Literature

Patent Literature 1: JP 2016-214639 A

SUMMARY OF INVENTION

Technical Problem

Regarding the management of the wait time described above and processing at the time when a player operation is input during the wait time, there is a problem in that unless the roles of the player terminal and the server are set appropriately, the wait time is not set appropriately, which causes the player to feel stressed.

It is an object of the present invention to provide an information processing system and an information processing method that make it possible to alleviate a player's stress.

Solution to Problem

In order to solve the problem described above, an information processing system includes: a terminal-side transmission unit that is provided at a player terminal and that executes transmission processing for transmitting action identification information corresponding to a selected action to a server on the basis of the input of a selecting operation for selecting one of a plurality of kinds of actions; a computation unit that is provided at the server and that executes update processing for updating a parameter at least on the basis of the received action identification information; a rendering-information setting unit that is provided at the server and that sets rendering information at least on the basis of the received action identification information; a display control unit that is provided at the player terminal and that causes a display unit to display an action image on the basis of the received rendering information; and a terminal-side-wait-period setting unit that is provided at the player terminal and that sets a terminal-side wait period on the basis of the input of a specific operation, and the terminal-side transmission unit does not execute the transmission processing during the terminal-side wait period.

Furthermore, the information processing system may further include an accumulation unit that is provided at the player terminal and that accumulates the action identification information corresponding to the selected action in a storage unit on the basis of the input of the selecting operation, the accumulation unit may be able to accumulate a plurality of items of the action identification information in the storage unit and may be able to accumulate the action identification information in the storage unit even in the case where the selecting operation is input during the terminal-side wait period, and the terminal-side transmission unit may transmit the action identification information accumulated in the storage unit to the server in the transmission processing.

Furthermore, the information processing system may include a server-side-wait-period setting unit that is provided at the server and that sets a server-side wait period at least on the basis of the action identification information or the rendering information, and the terminal-side-wait-period setting unit may set the terminal-side wait period on the basis of the server-side wait period in the case where the specific operation is input.

In order to solve the problem described above, an information processing system includes: a terminal-side transmission unit that is provided at a player terminal and that transmits action identification information corresponding to a selected action to a server on the basis of the input of a selecting operation for selecting one of a plurality of kinds of actions; a rendering-information setting unit that is provided at the server and that sets rendering information at least on the basis of the received action identification information; a display control unit that is provided at the player terminal and that causes a display unit to display an action image on the basis of the received rendering information; a server-side-wait-period setting unit that is provided at the server and that sets a server-side wait period at least on the basis of the action identification information or the rendering information; and a computation unit that is provided at the server, and that executes update processing for updating a parameter at least on the basis of the received action identification information in the case where the action identification information is received not during the server-side wait period, while not executing the update processing in the case where the action identification information is received during the server-side wait period.

Furthermore, the server may further include a waiting-information setting unit that sets server waiting information in the case where the action identification information is received during the server-side wait period, and the display control unit may cause the display unit to display a wait image in the case where the server waiting information is received.

In order to solve the problem described above, an information processing method includes: a step, executed at a player terminal, of executing transmission processing for transmitting action identification information corresponding to a selected action to a server on the basis of the input of a selecting operation for selecting one of a plurality of kinds of actions; a step, executed at the server, of executing update processing for updating a parameter at least on the basis of the received action identification information; a step, executed at the server, of setting rendering information at least on the basis of the received action identification information; a step, executed at the player terminal, of causing a display unit to display an action image on the basis of the received rendering information; and a step, executed at the player terminal, of setting a terminal-side wait period on the basis of the input of a specific operation, and the transmission processing is not executed during the terminal-side wait period.

In order to solve the problem described above, an information processing method includes: a step, executed at a player terminal, of transmitting action identification information corresponding to a selected action to a server on the basis of the input of a selecting operation for selecting one of a plurality of kinds of actions; a step, executed at the server, of setting rendering information at least on the basis of the received action identification information; a step, executed at the player terminal, of causing a display unit to display an action image on the basis of the received rendering information; a step, executed at the server, of setting a server-side wait period at least on the basis of the action identification information or the rendering information; and a step, executed at the server, of executing update processing for updating a parameter at least on the basis of the received action identification information in the case where the action identification information is received not during the server-side wait period, while not executing the update processing in the case where the action identification information is received during the server-side wait period.

Effects of Disclosure

The present invention makes it possible to alleviate a player's stress.

DESCRIPTION OF EMBODIMENTS

An aspect of an embodiment of the present invention will be described below in detail with reference to the accompanying drawings. The numerical values, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
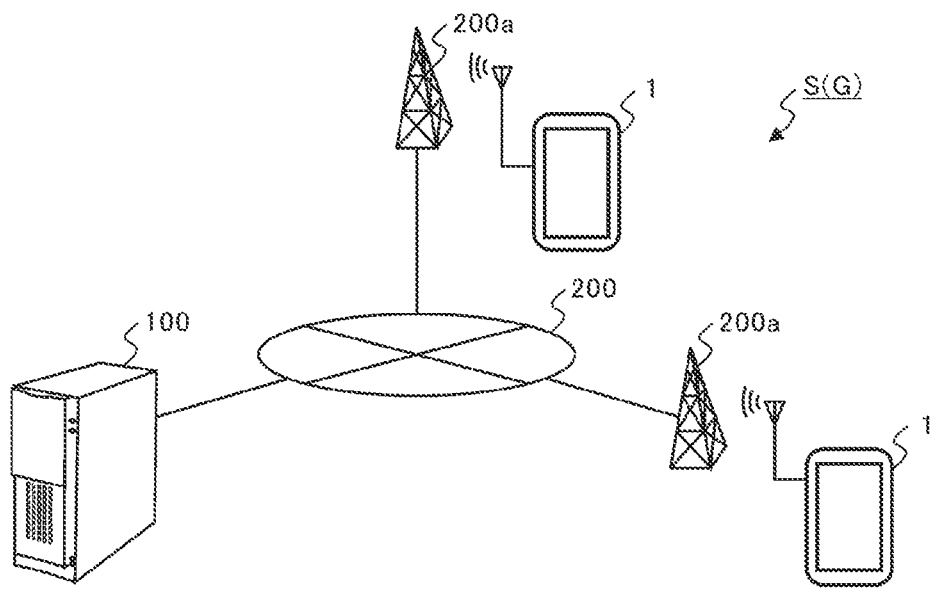
FIG. 1 is an explanatory illustration schematically showing the configuration of an information processing system.

FIG. 1 is an explanatory illustration schematically showing the configuration of an information processing system S. The information processing system S is what is called a client-server system including player terminals 1, a server 100, and a communication network 200 having communication base stations 200a.

The player terminals 1 can establish communication with the server 100 via the communication network 200. The player terminals 1 include a wide range of electronic appliances that are capable of communicatively connecting to the server 100 in a wireless or wired manner. Examples of the player terminals 1 include smartphones, mobile phones, tablet devices, personal computers, and game machines. This embodiment will be described in the context of a case where smartphones are used as the player terminals 1.

The server 100 is communicatively connected to the plurality of player terminals 1. The server 100 accumulates various kinds of information (player information) for each player who plays a game. Furthermore, the server 100 updates the accumulated information and controls the proceeding of the game on the basis of operations input from the player terminals 1.

The communication base stations 200a are connected to the communication network 200 and send information to and receive information from the player terminals 1 in a wireless manner. The communication network 200 is implemented by a mobile phone network, an Internet network, a local area network (LAN), a specialized circuit, or the like, and realizes wireless or wired communication connection between the player terminals 1 and the server 100.

In the information processing system S in this embodiment, the player terminals 1 and the server 100 function as a game device G. The player terminals 1 and the server 100 individually share roles for controlling the proceeding of the game, and it becomes possible to proceed with the game through cooperation between the player terminals 1 and the server 100.

(Hardware Configurations of Player Terminals 1 and Server 100)

Figure 2A:
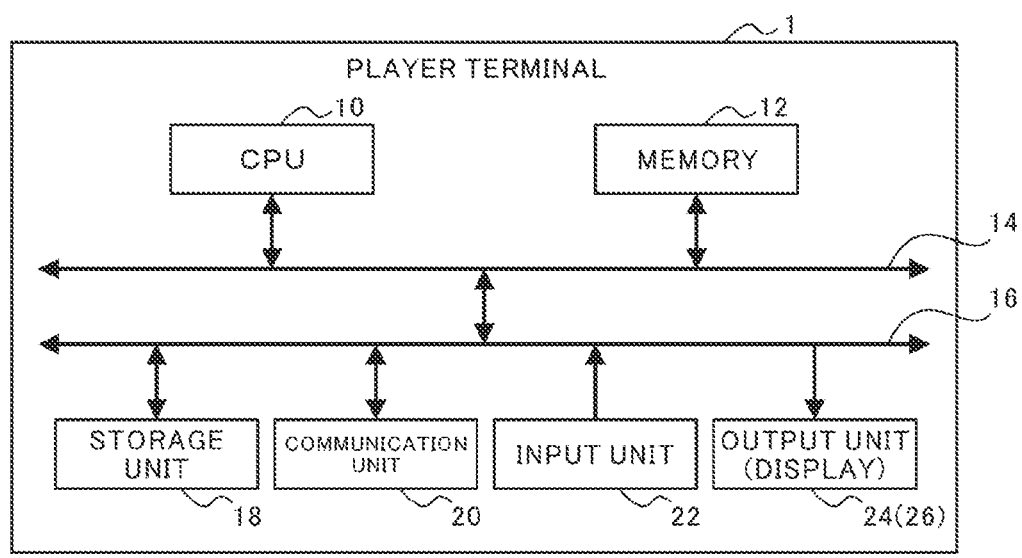
FIG. 2A is a diagram for explaining the hardware configuration of a player terminal.
Figure 2B:
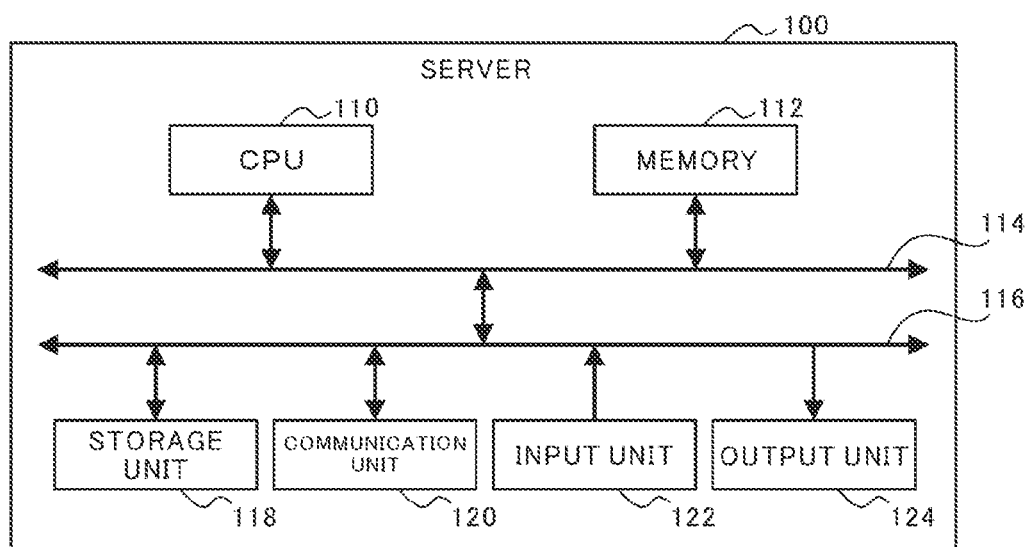
FIG. 2B is a diagram for explaining the hardware configuration of a server.

FIG. 2A is a diagram illustrating the hardware configuration of a player terminal 1. Furthermore, FIG. 2B is a diagram illustrating the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Therefore, the following description will be directed to the hardware configuration of the player terminal 1, while omitting a description of the server 100.

The CPU 10 runs a program stored in the memory 12 to control the proceeding of the game. The memory 12 is configured of a read only memory (ROM) or a random access memory (RAM), and stores the program and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory such as a dynamic random access memory (DRAM), and stores various kinds of programs and data. In the player terminal 1, the programs and data stored in the storage unit 18 are loaded into the memory 12 (RAM) by the CPU 10.

The communication unit 20 is communicatively connected to a communication base station 200a in a wireless manner, and sends information to and receives information from the server 100 via the communication network 200, such as various kinds of data and programs. In the player terminal 1, programs, etc. received from the server 100 are stored in the memory 12 or the storage unit 18.

The input unit 22 is configured of a unit via which player operations are input (operations are accepted), such as a touchscreen, buttons, a keyboard, a mouse, a cross keypad, or an analog controller. Furthermore, the input unit 22 may be a special controller provided at the player terminal 1 or connected (externally) to the player terminal 1. Alternatively, the input unit 22 may be configured of an acceleration sensor that detects tilting or movement of the player terminal 1 or a microphone that detects the player's voice. That is, the input unit 22 includes a wide range of devices that enable the input of the player's intents in distinguishable manners.

The output unit 24 is configured to include a display device and a speaker. Note that the output unit 24 may be a device connected (externally) to the player terminal 1. In this embodiment, the player terminal 1 includes a display 26 as the output unit 24 and includes a touchscreen as the input unit 22, the touchscreen being provided so as to be overlaid on the display 26.

(Game Specifics)

Next, the specifics of the game provided by the information processing system S (game device G) in this embodiment will be described by using an example. The game in this embodiment is what is called a roll playing game (RPG). A player can play a battle game in which mainly the player can raise ally characters and can battle against an enemy by using the raised ally characters.

Specifically, the player forms a party by selecting a plurality of ally characters. Furthermore, the player sets equipment, such as a weapon and protective gear, for each of the ally characters. Furthermore, in the battle game, the player determines the actions of the ally characters forming the party. Here, examples of the actions of the ally characters include an action for giving damage to the enemy character and an action for recovering the HPs of the ally characters. Then, when the player wins the battle game, the player can acquire a reward, such as an item or equipment.

Figure 3A:
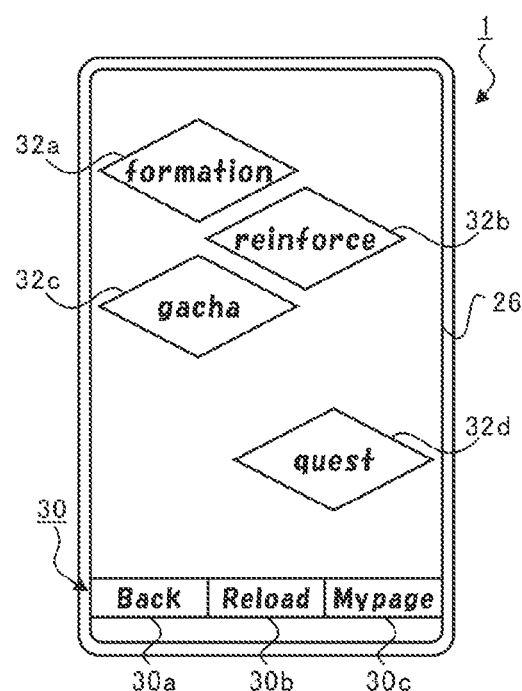
FIG. 3A is an illustration showing an example my page.
Figure 3B:
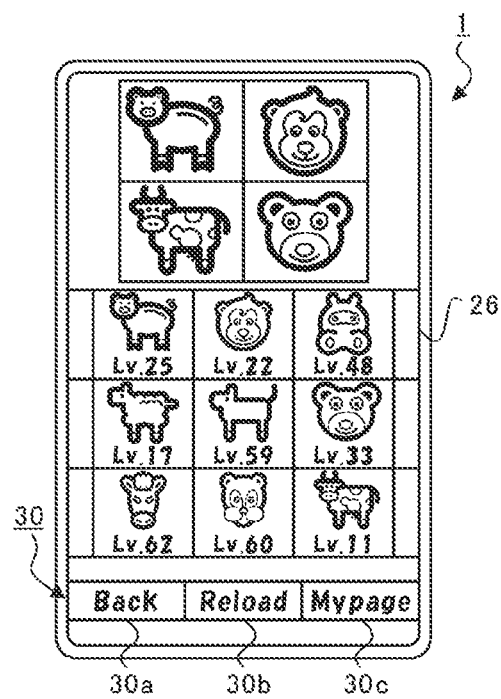
FIG. 3B is an illustration showing an example party formation page.
Figure 3C:
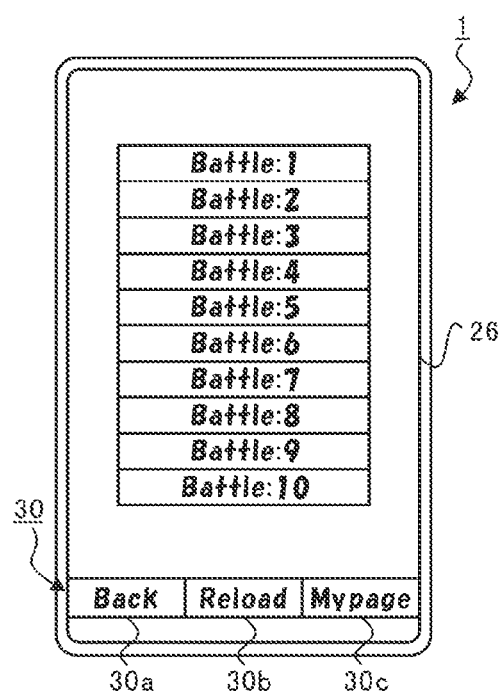
FIG. 3C is an illustration showing an example quest selection page.

FIG. 3A is an illustration showing an example my page. FIG. 3B is an illustration showing an example party formation page. FIG. 3C is an illustration showing an example quest selection page. The player can start the game by operating the input unit 22 to communicate with the server 100. During the game, game screens such as the ones shown in FIGS. 3A, 3B, and 3C are displayed on the display 26 of the player terminal 1.

During the game, for example, a menu bar 30 shown in FIG. 3A is displayed on the display 26. Although various screens are displayed on the display 26 during the game, the menu bar 30 is always displayed during the game. The menu bar 30 has provided therein a plurality of operable parts that can be operated (tapped) by the player. Here, as an example of the operable parts, a previous-screen selecting part 30a, a screen-reload selecting part 30b, and a my-page selecting part 30c are provided in the menu bar 30.

When the previous-screen selecting part 30a is tapped, the page that was displayed immediately before the page (screen) that is currently displayed is displayed on the display 26.

When the screen-reload selecting part 30b is tapped, various kinds of information corresponding to the current proceeding status of the game are received from the server 100, and a reloaded screen is displayed on the display 26. The screen-reload selecting part 30b is tapped, for example, when the player wishes to suspend the proceeding of the game, in other words, prescribed processing relating to the proceeding of the game is to be interrupted. Furthermore, in the case where a communication error occurs, such as the case where communication with the server 100 is disabled for a prescribed time, the player can retransmit information between the player terminal 1 and the server 100 by tapping the screen-reload selecting part 30b, which enables the player to resume the game.

When the my-page selecting unit 30c is tapped, the my page shown in FIG. 3A is displayed on the display 26. In the my page, a party formation icon 32a, a reinforcement icon 32b, a gacha icon 32c, and a quest icon 32d are displayed.

When the party formation icon 32a is tapped, the party formation page shown in FIG. 3B is displayed on the display 26. In the party formation page, it is possible to select characters for forming a party, to set equipment that the characters are to be equipped with, etc. The player can purchase characters or equipment for an in-game currency and can acquire characters or equipment as rewards in the battle game. In this embodiment, since a party is constituted of four characters, the player forms a party by selecting four characters from the characters that the player owns.

When the reinforcement icon 32b is tapped in the my page, a reinforcement page, which is not shown, is displayed on the display 26. Although not be described in detail, in the reinforcement page, it is possible to reinforce characters, equipment, items that can be used in the battle game, etc.

When the gacha icon 32c is tapped in the my page, a lottery page, which is not shown, is displayed on the display 26. In the lottery page, it is possible to perform a lottery for determining a character, equipment, an item, or the like that the player can acquire by using the in-game currency, a lottery ticket, or the like.

When the quest icon 32d is tapped in the my page, the quest selection page shown in FIG. 3C is displayed on the display 26. In the quest selection page, it is possible to select a battle game from a plurality of kinds provided therein. Furthermore, after selecting a battle game, the player can next select a party that the player wishes to use in the battle game. Then, when a battle game and a party have been selected, the battle game is started.

Figure 4A:
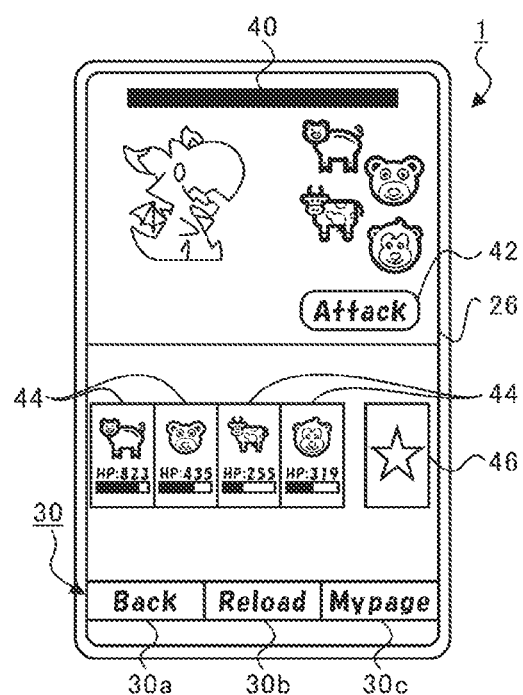
FIG. 4A is an illustration showing an example battle screen.
Figure 4B:
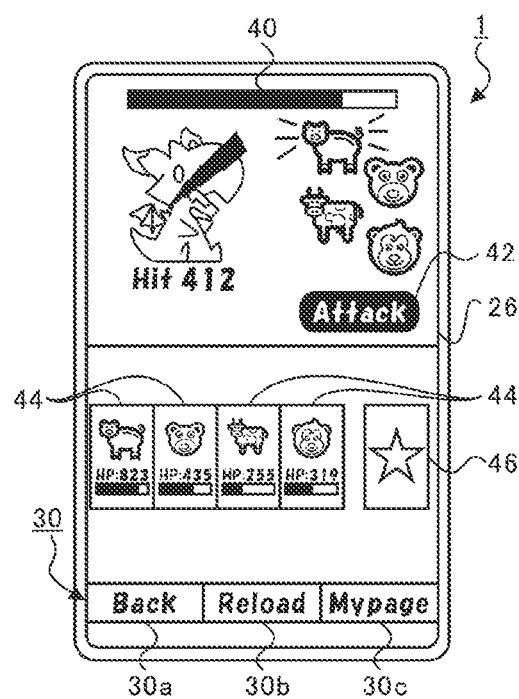
FIG. 4B is an illustration showing an example action image.

FIG. 4A is an illustration showing an example battle screen. FIG. 4B is an illustration showing an example action image. When a battle game is started, the four characters forming the party (hereinafter referred to as the ally characters) and an enemy character acting as the opponent in the battle are displayed in the upper part of the display 26. Although a single enemy character is displayed here, there are cases where a plurality of enemy characters are displayed.

Furthermore, in the upper part of the display 26, an enemy-character HP meter 40 indicating the remaining HP (physical energy) of the enemy character is displayed. The enemy-character HP meter 40 visually indicates the remaining HP of the enemy character. The player wins the battle game when the remaining HP of the enemy character become zero.

The player can select actions of the ally characters in the battle game. Three kinds of actions that can be selected by the player are provided, namely, normal attack actions, ability actions, and item usage actions. The display 26 displays a plurality of action icons for causing the ally characters to perform actions. Here, a normal attack icon 42, ally-character selecting icons 44, and an item selecting icon 46, as well as ability icons 48 and item icons, which will be described later, etc. are provided as the action icons.

When the normal attack icon 42 is tapped, a normal attack action is started, in which the four ally characters sequentially perform normal attack moves on the enemy character. In the normal attack moves, the ally characters attack the enemy character to damage the enemy character. When the normal attack moves are performed, action images (normal attack animation) in which the ally characters attack the enemy character are displayed sequentially for the individual ally characters, as shown in FIG. 4B.

Here, an animation in which the ally characters attack the enemy character, as well as the value of damage given to the enemy character, are displayed on the display 26 as the normal attack animation. Note that the value of damage given to the enemy character is subtracted from the remaining HP of the enemy character, and an animation in which the value on the enemy-character HP meter 40 decreases is also displayed.

When all the normal attack moves by the four ally characters are completed, then, the enemy character performs a counter-attack move. Examples of the counter-attack move by the enemy character include a normal attack move for attacking the ally characters to give damage thereto and a special attack move for restricting actions by the ally characters. In the case where the enemy character performs a counter-attack move, an animation corresponding to the determined counter-attack move is displayed on the display 26.

Furthermore, the ally-character selecting icons 44 are displayed in the lower part of the display 26. The ally-character selecting icons 44 are provided for the individual ally characters, and the HPs of the ally characters are displayed therein. When a damage value is given to an ally character as a result of a counter-attack move by the enemy character, an animation in which the HPs displayed in the ally-character selecting icon 44 decrease is displayed.

As described above, the player can cause the ally characters to execute a normal attack action as an action of the ally characters by tapping the normal attack icon 42. When the normal attack action is executed, first, four normal attack moves by the ally characters are executed, and then a counter-attack move by the enemy character is executed.

Here, the battle game is broadly divided into two segments, namely, a special action segment and a normal attack segment. The special action segment is a segment in which the player selects and executes an ability action and an item usage action. The normal attack segment is a segment in which the normal attack action described above, i.e., normal attack moves by the ally characters and a counter-attack move by the enemy character, is performed.

In the following, two segments consisting of a special action segment and a normal attack segment will collectively be referred to as a single turn. The battle game proceeds while repeating single turns. A single turn starts with a special action segment. Then, when a normal attack action by the ally characters is started, the special action segment comes to an end, followed by a normal attack segment. The special action segment is continued unless the player taps the normal attack icon 42. Then, the battle game ends in a defeat for the player when the HPs of all the ally characters become zero while single turns are repeated, and the battle game ends in a victory for the player when the HP of the enemy character become zero.

Here, each of the ally characters has an ability (special ability) preset therefor. Examples of the ability include an ability to enhance the attacking ability or defensive ability of the ally character, an ability to recover the HP of the ally character, the ability to decrease the attacking ability or defensive ability of the enemy character, and the ability to give considerable damage value to the enemy character. In the special action segment, the player can invoke available abilities as many times as the player wishes. However, each ability has a usage restriction condition set therefor, and the player can select only abilities that are not subject to usage restrictions. As examples of usage restriction conditions, provided are: an ability for which the number of times of usage during a single battle game is set, and an ability for which the number of turns required before the ability becomes available again is set.

Furthermore, in the special action segment, the player can use an item by tapping an item selecting icon 46. Also in the case where an item is used, similarly to the case where an ability is used, the player can advantageously proceed with a battle game, for example, by enhancing the attacking ability or defensive ability of an ally character.

When using an ability, the player taps the ally-character selecting icon 44 for one of the ally characters. Furthermore, when using an item, the player taps the item selecting icon 46. When the item selecting icon 46 is tapped, owned items are displayed on the display 26 so that the player can select one of those items.

Figure 5A:
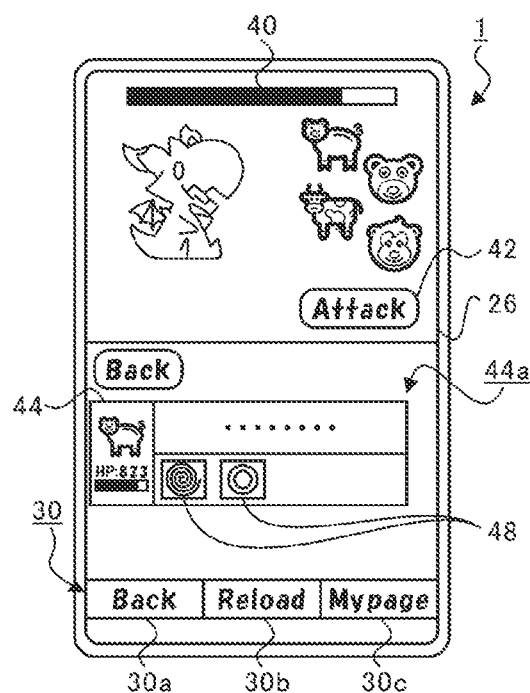
FIG. 5A is an illustration for explaining example ability icons.

FIG. 5A is an illustration for explaining an example of the ability icons 48. When an ally-character selecting icon 44 is tapped during the special action segment, the tapped ally-character selecting icon 44 is moved to the left end of the display 26, and the other ally-character selecting icons 44 and the item selecting icon 46 are hidden, as shown in FIG. 5A. At this time, an ability explanation area 44a is displayed on the right side of the ally-character selecting icon 44. In the ability explanation area 44a, the ability icons 48 and explanations of abilities are displayed.

The ability icons 48 are provided for individual abilities. When an ally-character selecting icon 44 is tapped, ability icons 48 corresponding to the abilities that the ally character is equipped with are displayed in the ability explanation area 44a. Note that the number of the ability icons 48 varies depending on the kind of the ally character, the level of the ally character, etc.

Figure 5B:
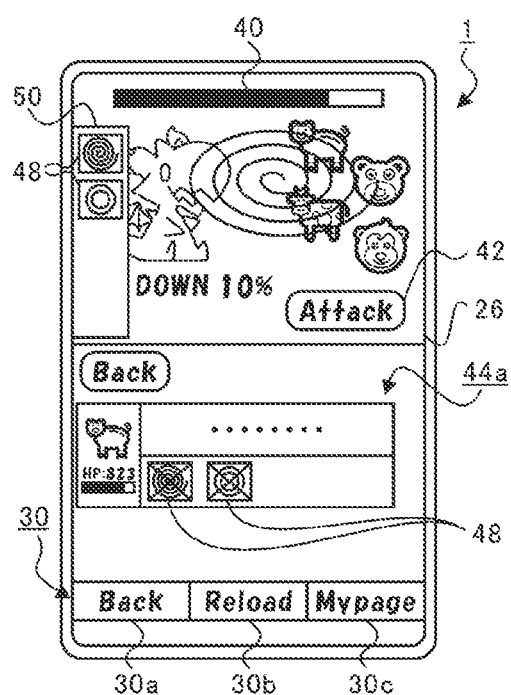
FIG. 5B is an illustration for explaining an example animation that is provided when an ability is used.

FIG. 5B is an illustration for explaining an example animation that is provided when an ability is used. When an ability icon 48 displayed in the ability explanation area 44a is tapped, a reserved-action display section 50 is displayed in the upper part of the display 26, as shown in FIG. 5B. At this time, the tapped ability icon 48 is displayed in the reserved-action display section 50.

Meanwhile, in the ability explanation area 44a, the display mode of the ability icon 48 displayed in the reserved-action display section 50 is changed to a usage restriction mode (here, a cross is displayed in a superimposed manner). Note that the display mode of the ability icon 48 is changed to the original display mode when the usage restriction is cancelled and the ability icon 48 becomes available again.

In the reserved-action display section 50, five ability icons 48 at most are displayed. The ability icons 48 are disposed from the top of the reserved-action display section 50 in the order in which the icons are tapped. Furthermore, in the special action segment, ability actions corresponding to ability icons 48 tapped by the player are performed. As a result of the ability actions, the values of various kinds of parameters (parameter values) used in the battle game, such as the HP, the attacking ability, etc. of the ally characters or the enemy character, are changed. Furthermore, action images corresponding to the ability actions (ability animations) are displayed on the display 26, as shown in FIG. 5B.

Figure 5C:
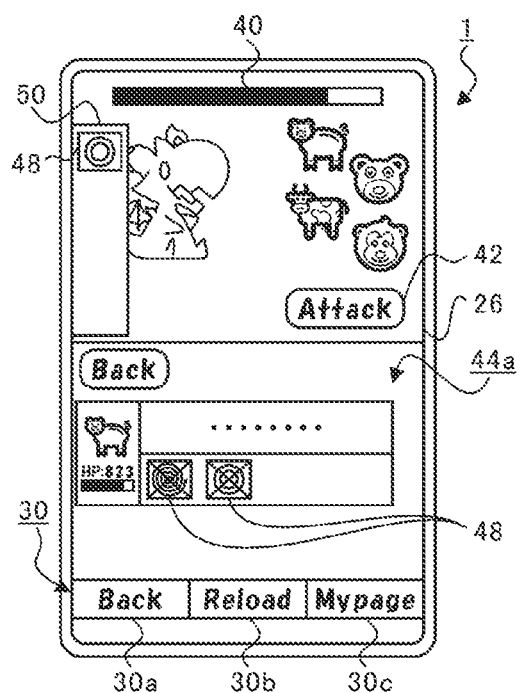
FIG. 5C is an illustration for explaining a state in which an ability action has been completed.
Figure 5D:
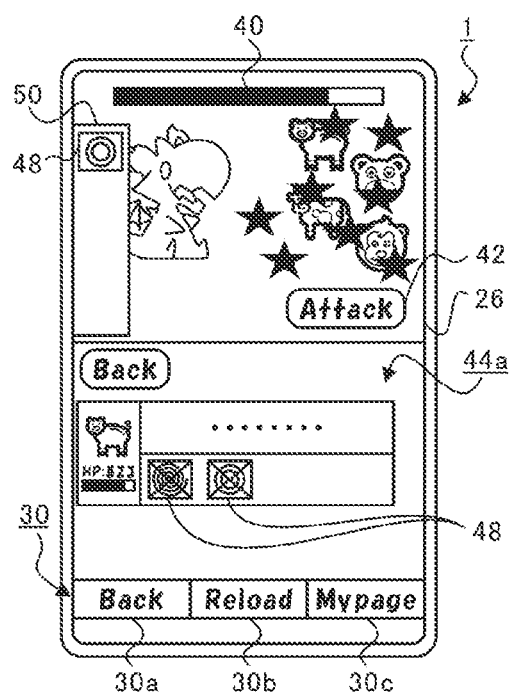
FIG. 5D is an illustration for explaining an example animation that is provided when a reserved ability action is started.

FIG. 5C is an illustration for explaining a state in which an ability action has been completed. FIG. 5D is an illustration for explaining an example animation that is provided when a reserved ability action is started. When the display of the ability animation is completed, the ability icon 48 that has been displayed uppermost in the reserved-action display section 50 is erased, and another ability icon 48 that has been displayed thereunder is moved upward, as shown in FIG. 5C. That is, the ability icon 48 corresponding to the ability used is erased as the ability animation is completed.

Then, the ability action corresponding to the ability icon 48 moved uppermost in the reserved-action display section 50 is started. Also in this case, similarly to the above, various kinds of parameters used in the battle game are changed. Furthermore, an ability animation corresponding to the ability action is displayed, as shown in FIG. 5D.

Note that in the case where the next ability is not reserved when an ability action is completed, in other words, in the case where the next ability icon 48 is not displayed in the reserved-action display section 50, the reserved-action display section 50 becomes hidden as the ability animation is completed.

As described above, the player can use the abilities of the ally characters in the special action segment. When an ability is used, an ability animation corresponding to the ability is displayed. Furthermore, in the special action segment, the player can successively execute a plurality of ability actions. Note, however, that in the case where another ability icon 48 is tapped while an ability animation is being displayed, it is not possible to start an ability action immediately. In this case, the execution of the next ability action is postponed until the display of the ability animation is completed.

Note that although the case where an ability icon 48 is tapped and an ability action is reserved and is executed has been described here, also in the case where the item selecting icon 46 is tapped and then an item to use is determined, an item usage action is reserved and is executed, similarly to the above. In this case, an item icon corresponding to the item selected by the player, which is not shown, is displayed in the reserved-action display section 50. An item usage animation is displayed in the case where an item usage action is executed.

In this embodiment, it is possible to reserve five ability actions and item usage actions at most. It can be said that the reserved-action display section 50 reports abilities or items that are reserved for usage to the player.

Furthermore, when an ability icon 48 or item icon displayed in the reserved-action display section 50 is tapped, the icon is erased from the reserved-action display section 50. That is, the player can cancel a reserved ability action or item usage action by tapping an ability icon 48 or item icon displayed in the reserved-action display section 50.

Note that the player may use some or all of the available abilities and items or may go without using them at all in the special action segment. In the case where a desired ability or item is used or in the case where there is no need to use an ability or item, the player can terminate the special action segment by tapping the normal attack icon 42.

Furthermore, although not described in detail, the player can tap the normal attack icon 42 also during an ability action or item usage action or in a state in which the usage of an ability or item has been reserved. In this case, an icon corresponding to the normal attack action is displayed in the reserved-action display section 50, which is a state in which the normal attack action has been reserved. Then, when the normal attack action is started, the normal attack segment begins and the special action segment is terminated. As described earlier, in the normal attack segment, the ally characters perform normal attack moves, and then the enemy character performs a counter-attack move, during which it is not allowed to reserve an ability or item.

Here, in this embodiment, in the special action segment, as described above, the player can preset a mode in which it is allowed to reserve the usage of abilities and items (reservation-enabled state) and a mode in which it is not allowed to reserve the usage of abilities and items (reservation-disabled state). When the state is set to the reservation-disabled state, for example, when an ability icon 48 displayed in the ability explanation area 44a is tapped, an ability action is started immediately, but the reserved-action display section 50 is not displayed. Furthermore, while an action image (a normal attack animation, an ability animation, or an item usage animation) is being displayed, tapping of an ability icon 48 in the ability explanation area 44a is not effective.

Furthermore, the display times of animations (action images) vary, and it takes a long time for display depending on the kind of animation. Although not described in detail, during the battle game, a prescribed meter value is accumulated for each ally character. The meter value increases by a prescribed value for each single turn or increases as an ability or item is used. When the normal attack icon 42 is tapped in a state in which the meter value has reached a maximum value, an attack move by the ally character whose meter value has reached the maximum value becomes an esoteric attack move. The esoteric attack move gives greater damage to the enemy character compared with the normal attack move. Therefore, an animation (attack image) corresponding to the esoteric attack move takes a longer time than an animation corresponding to the normal attack move.

Furthermore, although the esoteric attack move described above can be invoked by each ally character alone, the esoteric attack move can also be invoked simultaneously by a plurality of ally characters. For example, the esoteric attack move is invoked when the normal attack icon 42 is tapped in a state where the meter values of the four ally characters have all reached the maximum value. With the esoteric attack move, it is possible to give a very large damage to the enemy character, and the time it takes for the animation therefor becomes very long compared with other animations. Some players may perceive such long animations as bothersome. In this embodiment, it is possible to forcibly terminate an animation by tapping the screen-reload selecting part 30b.

For example, when an ability action is started, various kinds of parameters, such as the HP of the enemy character, are updated, and such results of the ability action are reported when the ability animation is completed. Meanwhile, the results of an ability action are already derived at the server 100 when the ability action is started. In the case where the screen-reload selecting part 30b is tapped while an ability animation is being displayed, the ability animation is terminated, and a screen reflecting the result of the ability action is displayed on the display 26. Note that also in the case where the screen-reload selecting part 30b is tapped in the normal attack segment, processing similar to that in the case where the screen-reload selecting part 30b is tapped in the special action segment is performed.

As described above, the player can forcibly terminate an animation by tapping the screen-reload selecting part 30b. However, if animations are always terminated forcibly, there is a risk that the intrinsic fun of the game might be compromised. Furthermore, for example, in the case where a battle game is played by a plurality of players in cooperation, there are cases where players are awarded with items in accordance with the ratios of damage values given to the enemy character. In such a case, if it is allowed to forcibly terminate animations unconditionally, the mere speed of operations will be pursued, which also compromises the intrinsic fun of the game.

Thus, it is conceivable to set a wait period in the case where an animation is forcibly terminated so that the next action will not be started during the wait period. However, the player will feel stressed if the wait period is not set appropriately. In this embodiment, a wait period is set in the following manner in the case where an animation is forcibly terminated by tapping the screen-reload selecting part 30b.

Figure 6A:
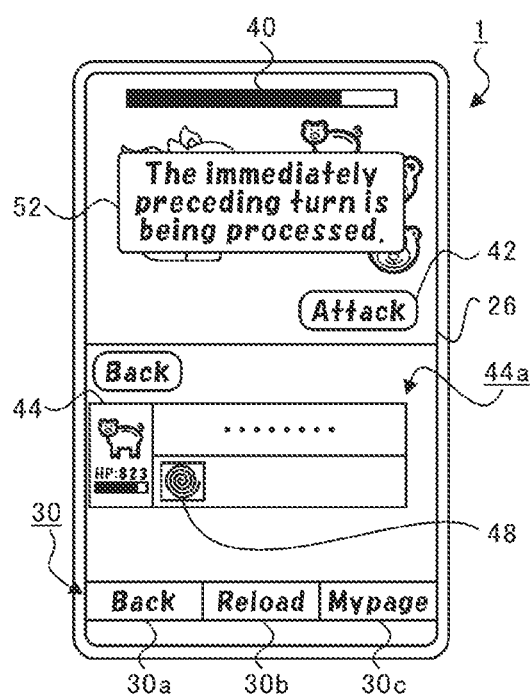
FIG. 6A is an illustration for explaining a wait period in a reservation-disabled state.
Figure 6B:
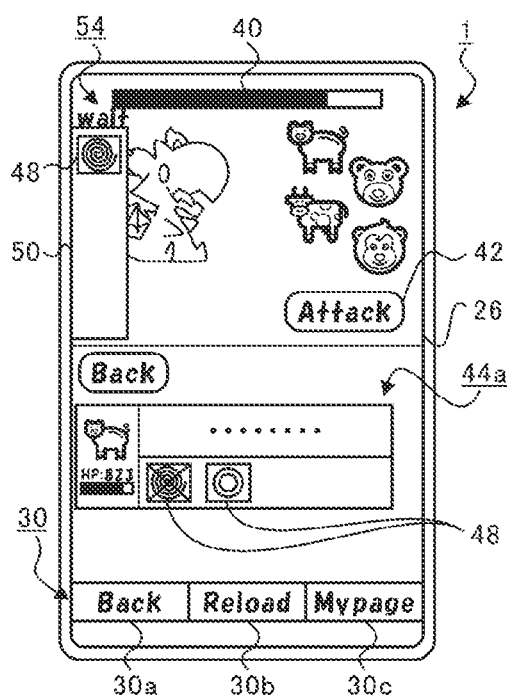
FIG. 6B is an illustration for explaining a wait period in a reservation-enabled state.

FIG. 6A is an illustration for explaining a wait period in the reservation-disabled state. FIG. 6B is an illustration for explaining a wait period in the reservation-enabled state. For example, suppose that an ability action for giving damage to the enemy character is executed. In this case, in the ability animation, an animation in which the enemy character is damaged is displayed for a prescribed time, and then an animation in which the meter value of the enemy-character HP meter 40 is decreased in accordance with the value of the given damage is displayed.

Suppose that, at this time, the state is set to the reservation-disabled state and the screen-reload selecting part 30b is tapped while an ability animation is being displayed. In this case, the ability animation is forcibly terminated, and a screen reflecting the result of the action is displayed on the display 26. That is, in this case, the enemy-character HP meter 40 is displayed with a meter value in the state where the damage value due to the ability action has been subtracted from the original HP of the enemy character.

Furthermore, in the case where the screen-reload selecting part 30b is tapped, a wait period is set in accordance with the remaining display time of the animation, i.e., in accordance with the timing at which the screen-reload selecting part 30b is tapped. As will be described later in detail, as wait periods, a terminal-side wait period, which is managed at the player terminal 1, and a server-side wait period, which is managed at the server 100, are provided. These terminal-side wait period and server-side wait period are managed individually. As will be described in detail, the terminal-side wait period is not set in the reservation-disabled state, and the proceeding of the game is controlled on the basis of the server-side wait period.

In the wait period (server-side wait period), operations relating to actions of the ally characters become ineffective. For example, when an ability icon 48 is tapped during the wait period, a wait image 52 is displayed on the display 26, as shown in FIG. 6A. Here, a message saying "the immediately preceding turn is being processed" is displayed as the wait image 52.

Meanwhile, suppose that the state is set to the reservation-enabled state and the screen-reload selecting part 30b is tapped while an ability animation is being displayed. Also in this case, similarly to the case of the reservation-disabled state described above, the ability animation is forcibly terminated, and a screen reflecting the result of the action is displayed on the display 26.

As described above, it is possible to reserve individual actions in the reservation-enabled state. However, in the case where an animation is forcibly terminated in the reservation-enabled state, reserved actions are all cancelled. Therefore, in the case where the screen-reload selecting part 30b is tapped and the screen is reloaded, the reserved-action display section 50 becomes hidden.

Furthermore, when the screen-reload selecting part 30b is tapped, a wait period is set in accordance with that timing. At this time, in the reservation-enabled state, the proceeding of the game is controlled on the basis of the terminal-side wait period. During the wait period (terminal-side wait period), the start of actions by the ally characters is restricted.

However, in the case where the state is set to the reservation-enabled state, it is possible to reserve individual actions even in the wait period. For example, when an ability icon 48 displayed in the ability explanation area 44a is tapped during the wait period, the reserved-action display section 50 is displayed, and the ability icon 48 is displayed in the reserved-action display section 50, as shown in FIG. 6B.

At this time, a second waiting image 54 is displayed on the display 26 to report a state of waiting for an action to be started. Here, "wait" is displayed in an upper part of the reserved-action display section 50 as the second waiting image 54. As described above, actions reserved during the wait period are started in order of reservation after the wait period comes to an end. Furthermore, the second waiting image 54 is erased as a reserved action is started.

Here, it is allowed to reserve three kinds of actions during the wait period, namely, normal attack actions, ability actions, and item usage actions. Alternatively, for example, it may be allowed to reserve only ability actions and item usage actions during the wait period. That is, it may be allowed to reserve only some of the three kinds of actions during the wait period.

As described above, in the case where the state is set to the reservation-enabled state, it is possible to reserve individual actions during the wait period. If it is not allowed to reserve individual actions during the wait period, the player will feel bothered during the wait period. According to this embodiment, by allowing the reservation of actions while restricting the start of the actions during the wait period, it is possible to start the actions immediately as the wait period elapses. This serves to alleviate the stress of the player. Alternatively, the reservation of actions may be entirely prohibited during the wait period even in the reservation-enabled state.

Next, a communication process between the player terminal 1 and the server 100 for setting the wait periods described above will be described. Here, processing relating to the wait periods will be described by using an example, and processing not relating to the wait periods will not be described.

(Communication Process Between Player Terminal 1 and Server 100)

Figure 7:
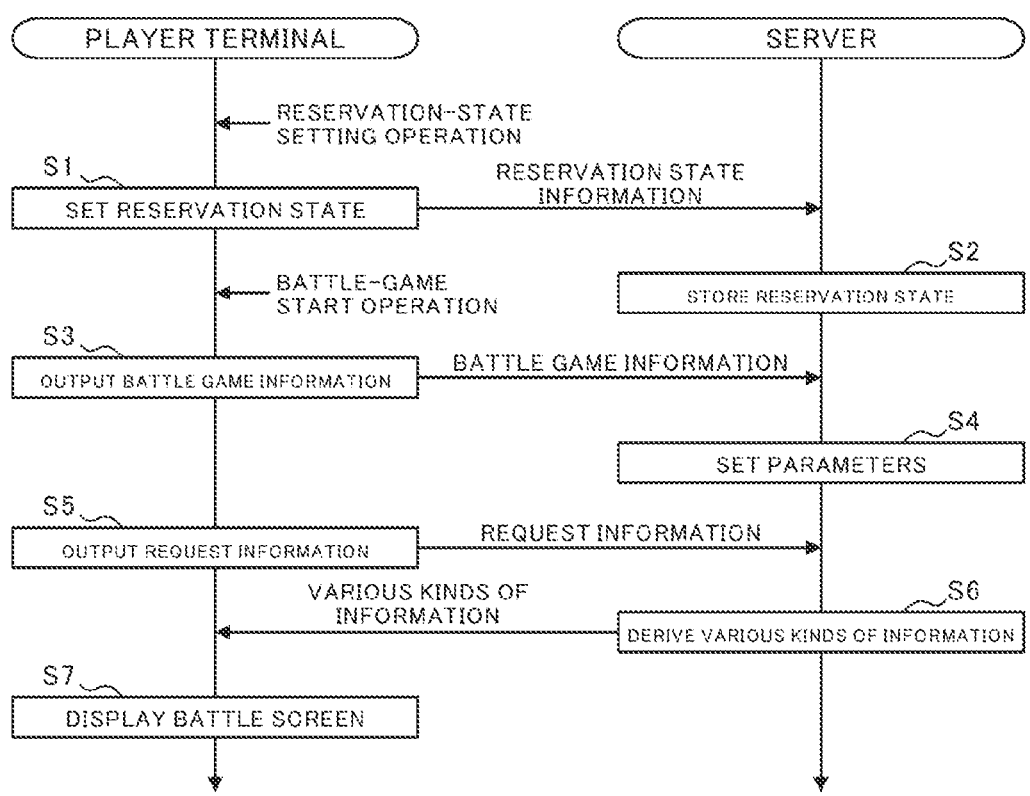
FIG. 7 is a sequence chart for explaining basic processes of the player terminal and the server in a battle game.

FIG. 7 is a sequence chart for explaining a basic process of the player terminal 1 and the server 100 in a battle game. The player can set the reservation-enabled state and the reservation-disabled state, described above, by setting a reservation-state setting operation via the input unit 22. As described above, in the case where the state is set to the reservation-enabled state, it is allowed to reserve actions, i.e., to use the reserved-action display section 50, in the battle game. Meanwhile, in the case where the state is set to the reservation-disabled state, it is not allowed to reserve actions, and the reserved-action display section 50 is not displayed.

At the player terminal 1, a reservation state (either the reservation-enabled state or the reservation-disabled state) is set on the basis of a reservation-state setting operation (S1). In the case where the player does not perform a reservation-state setting operation, the state is set to the reservation-enabled state as an initial state. When the reservation-state setting operation is input, reservation state information is transmitted from the player terminal 1 to the server 100. Although not described in detail, it is possible to perform a reservation-state setting operation even during a battle game. In the case where the setting of the reservation state is changed during a battle game, the battle screen is reloaded. At the server 100, the reservation state is stored on the basis of the received reservation state information (S2). As described above, the reservation state is stored at both the player terminal 1 and the server 100.

Furthermore, when a battle-game start operation is input via the input unit 22, battle game information is transmitted from the player terminal 1 to the server 100 (S3). The battle game information is information needed in the battle game selected by the player, such as the kinds of ally characters forming a party and the equipment of the individual ally characters.

Upon receiving the battle game information, the server 100 allocates a processing area in the memory 112 and sets various kinds of parameters (S4). Here, for example, the HPs, attacking abilities, defensive abilities, etc. of the ally characters and the enemy character are set.

Furthermore, when the battle-game start operation is input, request information, together with the battle game information, is transmitted from the player terminal 1 to the server 100 (S5). The request information serves to request the server 100 of the values of various kinds of parameters stored in the server 100, as well as rendering information for display on the display 26, etc. Upon receiving the request information, the server 100 derives various kinds of information including the parameter values read from the processing area and the rendering information (S6). The player terminal 1 displays a battle screen (initial screen) on the display 26 on the basis of the various kinds of information received (S7).

Figure 8:
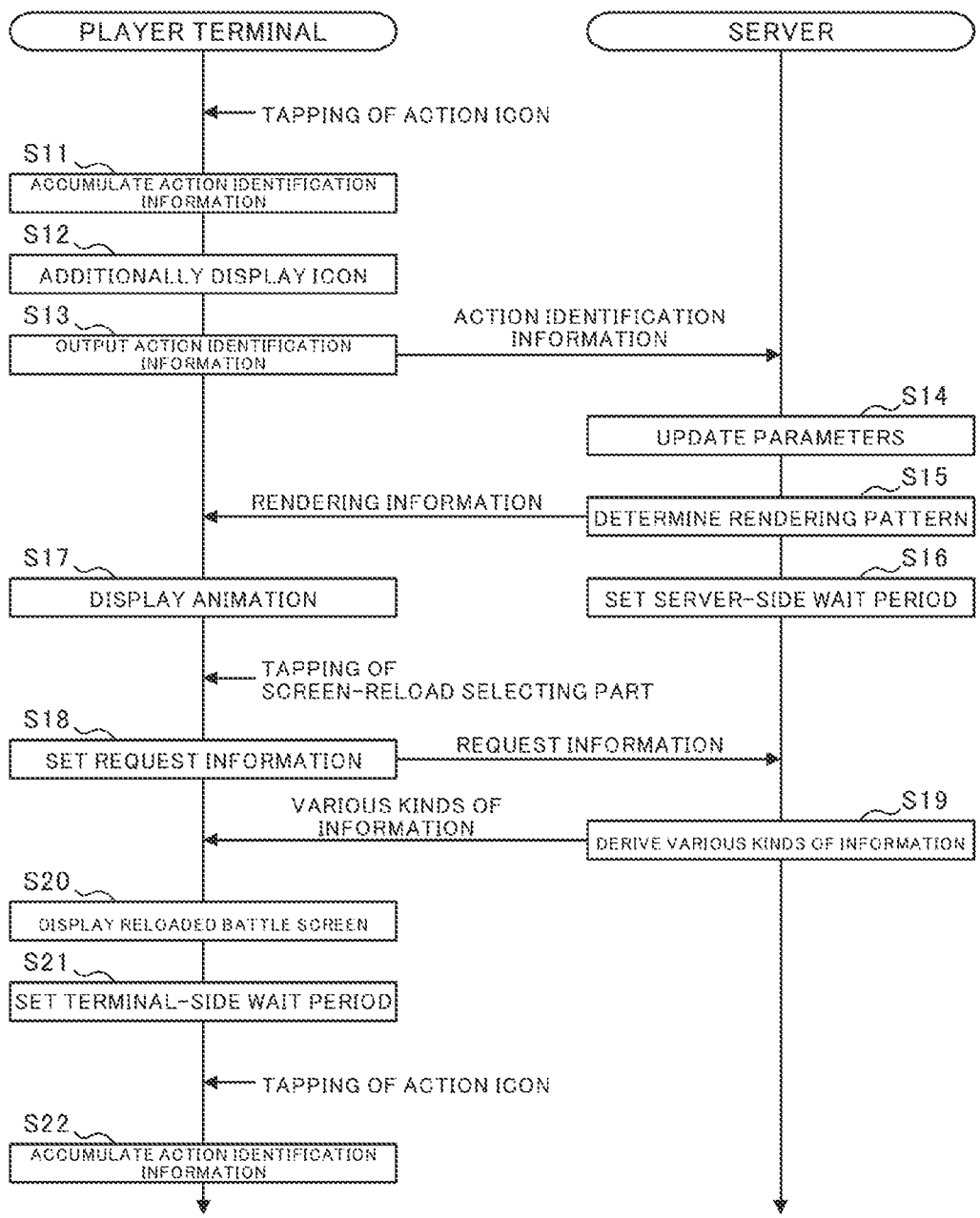
FIG. 8 is a sequence chart for explaining an example communication process between the player terminal and the server in the case where the state is set to the reservation-enabled state.

FIG. 8 is a sequence chart for explaining an example communication process between the player terminal 1 and the server 100 in the case where the state is set to the reservation-enabled state. Suppose that, in the case where the state is set to the reservation-enabled state, one of the action icons (the normal attack icon 42, the ability icons 48, and the item icons here) is tapped in the special action segment of a battle game. At this time, at the player terminal 1, action identification information corresponding to the tapped icon is accumulated in an action reservation area of the memory 12 (S11).

Furthermore, at the player terminal 1, display control is executed to add the tapped icon to the reserved-action display section 50 (S12). Then, upon entering a state in which an animation is not being displayed and that does not fall in the terminal-side wait period, it becomes possible for the player terminal 1 to transmit the action identification information. In this case, the action identification information first accumulated in the action reservation area is transmitted to the server 100 (S13).

Upon receiving the action identification information, the server 100 updates the various kinds of parameters on the basis of the received action identification information (S14). Here, for example, change values of the HPs, attacking abilities, defensive abilities, etc. of the enemy character or the ally characters are derived, and addition, subtraction, multiplication, or division is performed on the stored parameter values with the derived change values.

Furthermore, the server 100 determines a rendering pattern on the basis of the received action identification information (S15). The rendering pattern includes move patterns of the ally characters and the enemy character, display patterns of animations corresponding to various kinds of actions, effects to be displayed on the display 26, etc. A large number of rendering patterns are provided, and one of those rendering patterns is determined. Note that the rendering pattern may be determined on the basis of only the action identification information, or may be determined on the basis of the combination of the action identification information and parameter change values or updated parameter values. Alternatively, the rendering pattern may be determined on the basis of only parameter change values or updated parameter values.

Furthermore, at the server 100, the server-side wait period is set on the basis of the received action identification information (S16). Here, wait periods are preset for individual items of action identification information, and a wait period (timer value) is set to a timer on the basis of the received action identification information. The timer value set to the timer is decremented through prescribed timer update processing. Furthermore, the period during which a timer value other than zero is set to the timer serves as the server-side wait period. Although the server-side wait period is set on the basis of the action identification information here, for example, the server-side wait period may be determined on the basis of the rendering pattern. Note that the timing at which the player terminal 1 receives rendering information may be the timing at which the server-side wait period is set.

The player terminal 1 receives rendering information corresponding to the rendering pattern determined at the server 100, and displays an animation on the basis of the received rendering information (S17). Furthermore, suppose, for example, that the screen-reload selecting part 30b is tapped while the animation is being displayed. In this case, the player terminal 1 transmits request information to the server 100 (S18). At the server 100, upon receiving the request information, various kinds of information including the parameter values read from the processing area and the rendering information are derived (S19). The player terminal 1 displays a reloaded battle screen on the display 26 on the basis of the received various kinds of information (S20).

As described above, at the server 100, the parameters are updated when action identification information is received (S14). Therefore, in the case where the screen-reload selecting part 30b is tapped while an animation is being displayed, the player terminal 1 receives information corresponding to the updated parameters. Therefore, in S20, a battle screen reflecting the result of an action is displayed.

Furthermore, the various kinds of information derived in S19 include server wait time information indicating the current timer value (wait time) stored in the timer. At the player terminal 1, the terminal-side wait period is set on the basis of the server wait time information (S21). The setting of the terminal-side wait period will be described later in detail.

Suppose that an action icon (the normal attack icon 42, the ability icons 48, and the item icons here) is tapped during the terminal-side wait period. Also in this case, similarly to the above, at the player terminal 1, action identification information corresponding to the tapped icon is accumulated in the action reservation area of the memory 12 (S22).

Figure 9:
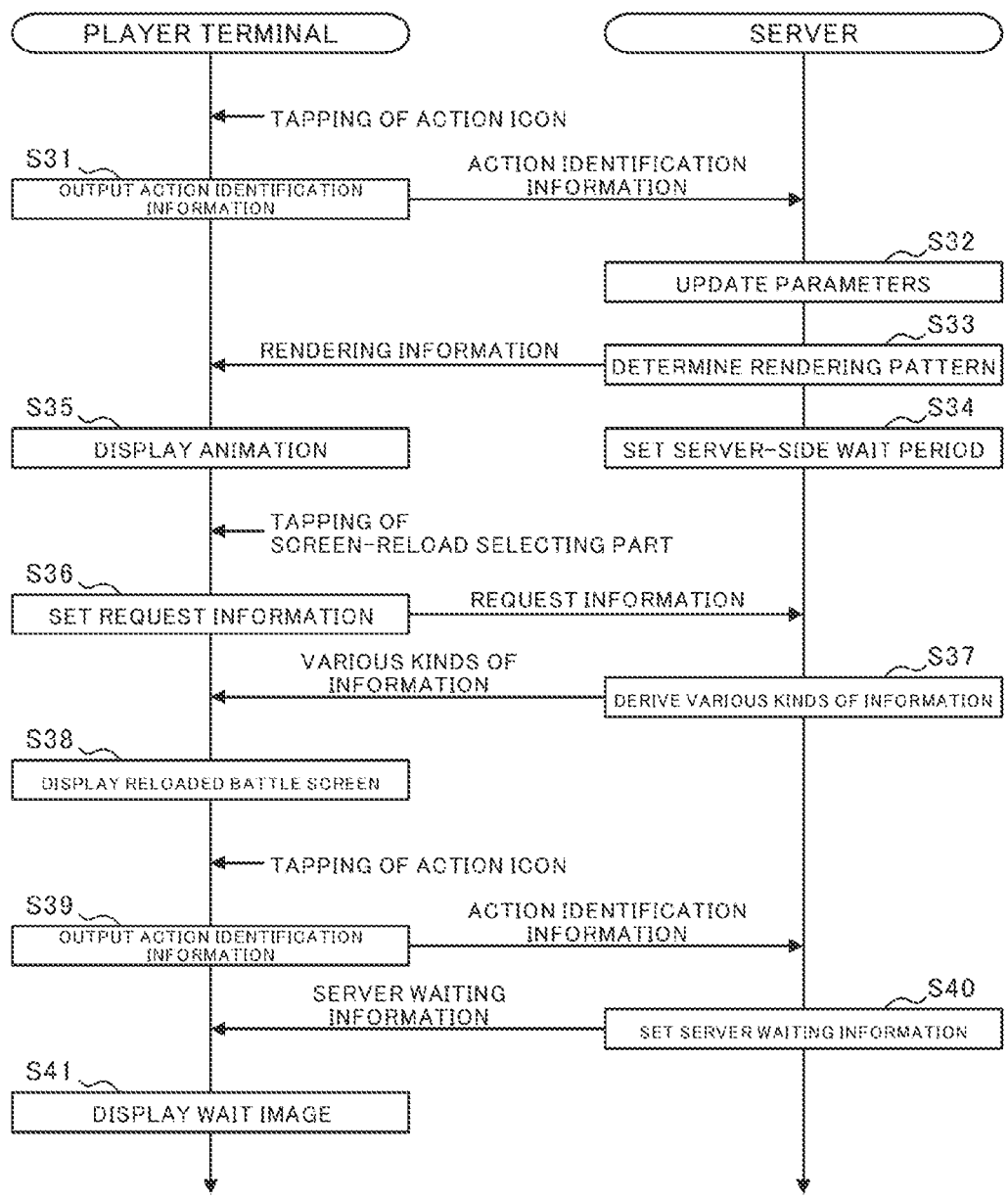
FIG. 9 is a sequence chart for explaining an example communication process between the player terminal and the server in the case where the state is set to the reservation-disabled state.

FIG. 9 is a sequence chart for explaining an example communication process between the player terminal 1 and the server 100 in the case where the state is set to the reservation-disabled state. Suppose that, in the case where the state is set to the reservation-disabled state, an action icon (the normal attack icon 42, the ability icons 48, and the item icons here) is tapped in the special action segment of a battle game. At this time, at the player terminal 1, action identification information corresponding to the tapped icon is transmitted to the server 100 (S31).

Upon receiving the action identification information, the server 100 updates the parameters (S32), determines a rendering pattern (S33), and sets the server-side wait period (S34). The processing in these steps S32, S33, and S34 is the same as the above-described processing in steps S14, S15, and S16. Furthermore, the player terminal 1 receives rendering information corresponding to the rendering pattern determined at the server 100, and displays an animation on the basis of the received rendering information (S35). Note that the timing at which the player terminal 1 receives rendering information may be the timing at which the server-side wait period is set.

Furthermore, suppose that the screen-reload selecting part 30b is tapped while an animation is being displayed. In this case, the player terminal 1 transmits request information to the server 100 (S36). At the server 100, upon receiving the request information, various kinds of information are derived, similarly to S19 described above (S37). The player terminal 1 displays a reloaded battle screen on the display 26 on the basis of the received various kinds of information (S38). Also here, the display 26 displays a battle screen reflecting the result of an action.

Suppose that, an action icon (the normal attack icon 42, the ability icons 48, and the item icons here) is then tapped immediately after the reloaded battle screen is displayed. Also in this case, similarly to S31 described above, action identification information corresponding to the tapped icon is transmitted to the server 100 (S39).

At the server 100, upon receiving the action identification information, it is checked whether or not the server 100 is in the server-side wait period, and sets server waiting information if the server 100 is in the server-side wait period (S40). Upon receiving the server waiting information from the server 100, the player terminal 1 displays a wait image 52 on the display 26 (S41).

Next, the functional configurations of the player terminal 1 and the server 100, as well as specific processing at the player terminal 1 and the server 100, will be described.

(Functional Configuration of Player Terminal 1)

Figure 10:
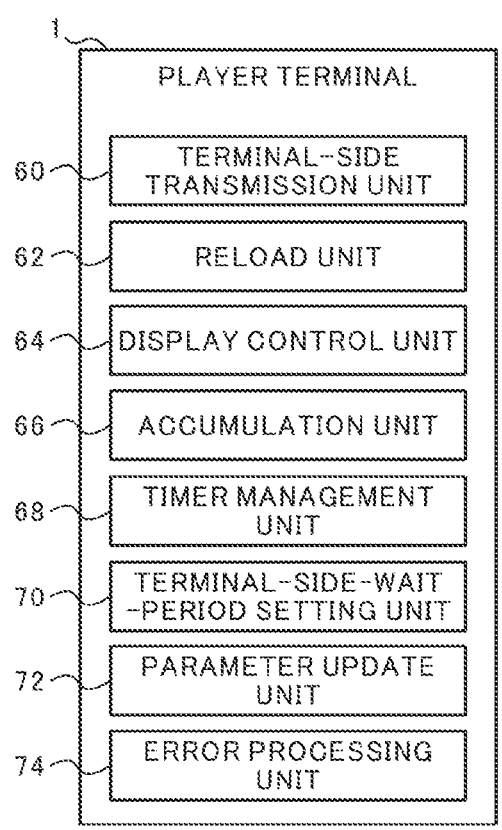
FIG. 10 is a diagram for explaining the functional configuration of the player terminal.

FIG. 10 is a diagram for explaining the functional configuration of the player terminal 1. In the player terminal 1, the memory 12 stores programs for running a game. The CPU 10 runs the various kinds of programs (modules) in the memory 12, and updates various kinds of parameters and data such as timer values, relating to the battle game, in a data storage area of the memory 12.

Furthermore, by running the individual programs, the CPU 10 causes the player terminal 1 to function as a terminal-side transmission unit 60, a reload unit 62, a display control unit 64, an accumulation unit 66, a timer management unit 68, a terminal-side-wait-period setting unit 70, a parameter update unit 72, and an error processing unit 74.

The terminal-side transmission unit 60 executes transmission processing for transmitting action identification information corresponding to a selected action to the server 100 on the basis of tapping of an action icon (the input of a selecting operation for selecting one of a plurality of kinds of actions). The terminal-side transmission unit 60 transmits action identification information accumulated in the action reservation area in the reservation-enabled state to the server 100. Note, however, that the terminal-side transmission unit 60 does not execute the transmission processing during the terminal-side wait period.

The reload unit 62 executes a page reloading process, which will be described later, when a battle game is started and in the case where the screen-reload selecting part 30b is tapped during the battle game.

The display control unit 64 causes the display 26 to display an animation (action image) mainly on the basis of rendering information received from the server 100. Furthermore, the display control unit 64 causes the display 26 to display a wait image 52 in the case where server waiting information is received from the server 100.

The accumulation unit 66 accumulates (stores) action identification information corresponding to a selected action in the action reservation area (storage unit) on the basis of tapping of an action icon (the input of a selecting operation). The accumulation unit 66 can accumulate a plurality of items of action identification information in the action reservation area. Furthermore, in the reservation-enabled state, the accumulation unit 66 can accumulate action identification information in the action reservation area also in the case where an action icon is tapped (a selecting operation is input) during the terminal-side wait period.

The timer management unit 68 sets timer values to various kinds of timers. Furthermore, the timer management unit 68 updates the timer values set to the timers.

The terminal-side-wait-period setting unit 70 sets a terminal-side wait period (terminal wait time) in the case where the screen-reload selecting part 30*b* is tapped (a specific operation is input). As will be described later in detail, the terminal-side-wait-period setting unit 70 sets a terminal-side wait period on the basis of a server-side wait period.

The parameter update unit 72 updates various kinds of parameter values used in the battle game in the memory 12 of the player terminal 1.

The error processing unit 74 executes error processing in the case where communication with the server 100 fails for a prescribed time.

(Functional Configuration of Server 100)

Figure 11:
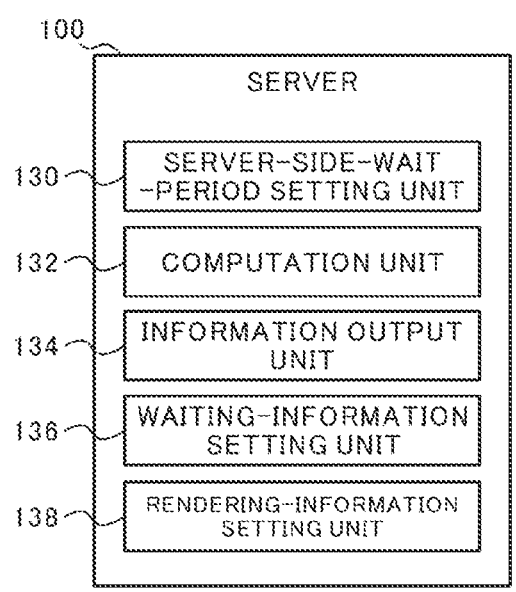
FIG. 11 is a diagram for explaining the functional configuration of the server.

FIG. 11 is a diagram for explaining the functional configuration of the server 100. In the server 100, the memory 112 stores programs for running a game. The CPU 110 runs the various kinds of programs (modules) in the memory 112, and updates various kinds of parameters and data such as timer values, relating to the battle game, in a data storage area of the memory 112.

Furthermore, by running the individual programs, the CPU 110 causes the server 100 to function as a server-side-wait-period setting unit 130, a computation unit 132, and information output unit 134, a waiting-information setting unit 136, and a rendering-information setting unit 138.

The server-side-wait-period setting unit 130 sets a server-side wait period (server wait time) at least on the basis of action identification information or rendering information.

The computation unit 132 executes update processing for updating parameters at least on the basis of received action identification information. Specifically, the update processing is executed at least on the basis of received action identification information in the case where action identification information is received at a timing not falling into the server-side wait period, and the update processing is not executed in the case where action identification information is received during the server-side wait period.

The information output unit 134, upon receiving request information from the player terminal 1, derives parameter values, etc. stored in the processing area of the memory 12 of the server 100 and sets various kinds of information.

The waiting-information setting unit 136 sets server waiting information in the case where action identification information is received during the server-side wait period.

The rendering-information setting unit 138 determines rendering information at least on the basis of received action identification information and sets the determined rendering information.

(Specific Processing at Player Terminal 1)

Figure 12:
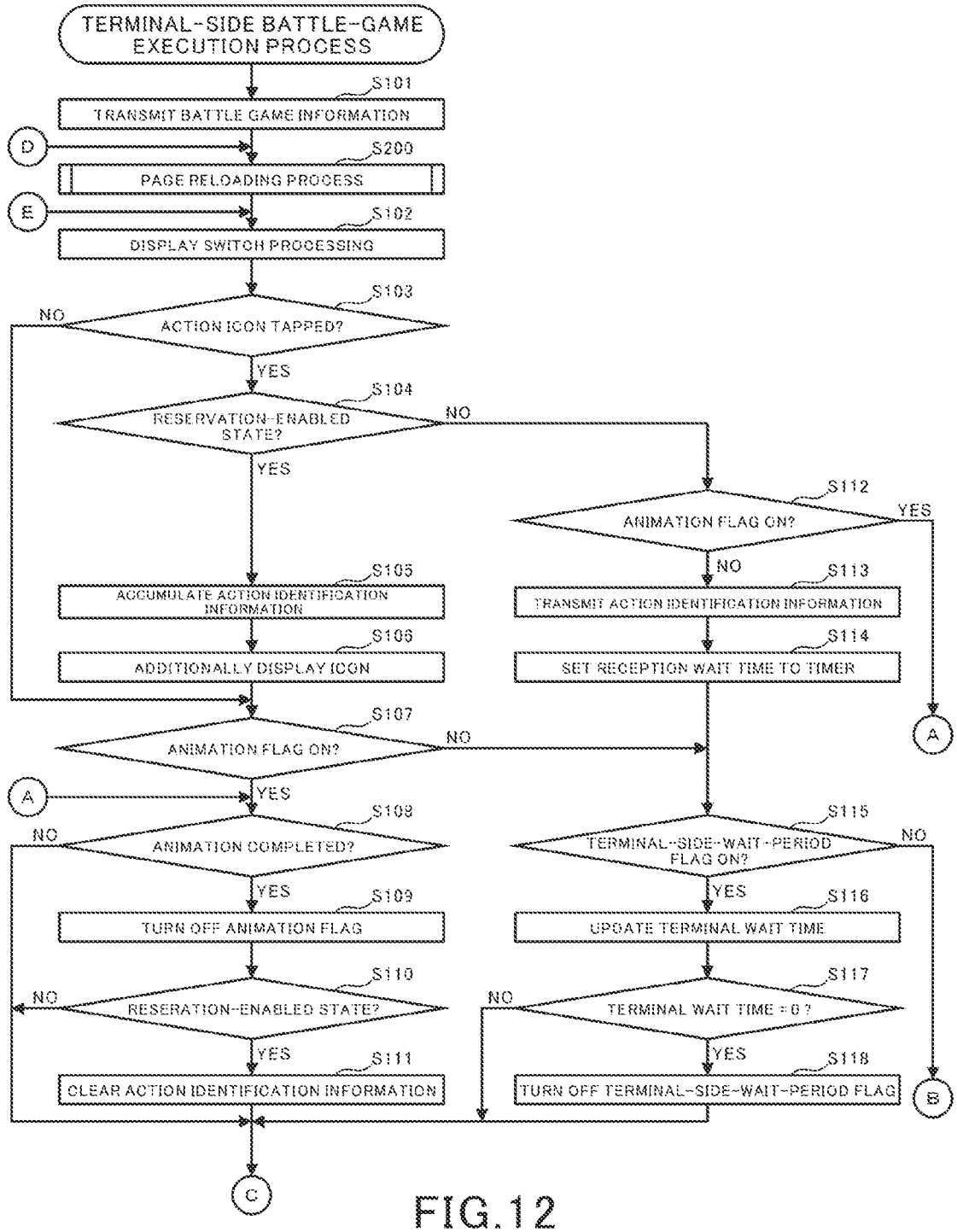
FIG. 12 is a first flowchart for explaining an example terminal-side battle-game execution process at the player terminal.
Figure 13:
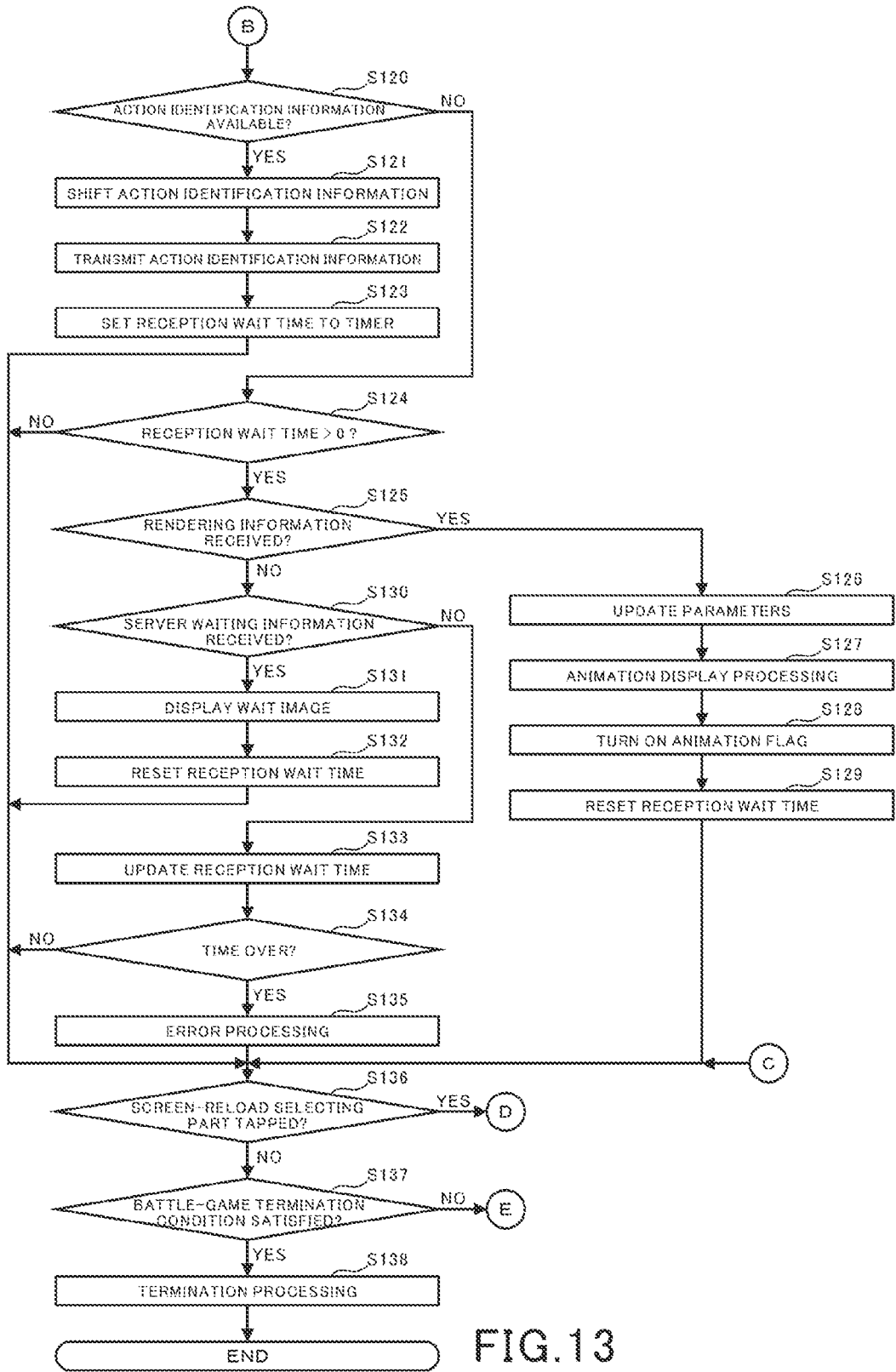
FIG. 13 is a second flowchart for explaining an example terminal-side battle-game execution process at the player terminal.

FIG. 12 is a first flowchart for explaining an example terminal-side battle-game execution process at the player terminal 1, and FIG. 13 is a second flowchart for explaining an example terminal-side battle-game execution process at the player terminal 1. As described earlier, the terminal-side battle-game execution process is started when a battle-game start operation is input. In the terminal-side battle-game execution process, first, the terminal-side transmission unit 60 transmits battle game information to the server 100 (S101).

Then, the reload unit 62 executes a page reloading process (S200). The page reloading process is processing for displaying (redisplaying) a battle screen on the display 26 when a battle game is started or in the case where the screen-reload selecting part 30*b* is tapped during a battle game. The page reloading process will be described later.

The display control unit 64 executes display switch processing for switching display on the display 26 on the basis of a player operation (S102). Here, for example, page switch processing, such as displaying the ability explanation area 44*a*, is executed in the case where an ally-character selecting icon 44 is tapped.

Furthermore, when an action icon (the normal attack icon 42, the ability icons 48, and the item icons here) is tapped (YES in S103), in the case where the state is set to the reservation-enabled state (YES in S104), the accumulation unit 66 accumulates action identification information in the action reservation area (S105). Here, the accumulation unit 66 accumulates action identification information corresponding to the tapped action icon. Furthermore, the display control unit 64 additionally displays the icon in the reserved-action display section 50 (S106).

Note that the action reservation area includes a plurality of (N+1) storage units, namely, zeroth to N-th storage units (N is an arbitrary integer). The zeroth storage unit stores action identification information corresponding to an action being executed. The first to N-th storage units store action identification information corresponding to reserved actions. In S105, vacant storage units (in which action identification information is not stored) are searched for in order from the first to N-th storage units. Then, action identification information corresponding to the tapped action icon is stored in a vacant storage unit identified first. Therefore, in the action reservation area, action identification information is stored in order from the first to N-th storage units. Note that in the case where an upper limit is defined for the number of actions that can be reserved, for example, it suffices to provide about two to ten storage units in the action reservation area. Alternatively, in the case where an upper limit is not defined for the number of actions that can be reserved, a number of storage units greater than the number of all the available actions should be provided in the action reservation area.

Furthermore, while each animation, such as an ability animation, is being displayed, an animation flag is turned on. That is, the animation flag is information for discriminating whether or not an animation is being displayed. In the state where the animation flag is on (YES in S107), when the display of an animation is completed (YES in S108), the display control unit 64 turns off the animation flag (S109). Furthermore, in the case where the state is set to the reservation-enabled state (YES in S110), the accumulation unit 66 clears the action identification information stored in the zeroth storage unit of the action reservation area (S111).

Meanwhile, when an action icon is tapped (YES in S103), if the state is set to the reservation-disabled state (NO in S104), and if the animation flag is off (NO in S112), the terminal-side transmission unit 60 transmits action identification information to the server 100 (S113). Furthermore, the timer management unit 68 sets a reception wait time to a timer (S114).

Note that the processing in and after S108 described above is executed (YES in S107 and YES in S112) regardless of the reservation state in the case where the animation flag is on. Similarly, the terminal-side-wait-period setting unit 70 determines whether or not a terminal-side wait-period flag is on regardless of the reservation state in the case where the animation flag is off (NO in S107 and NO in S112) (S115). Note that the terminal-side wait-period flag is kept on during the terminal-side wait period, and is turned off when the terminal-side wait period comes to an end. That is, here, the terminal-side-wait-period setting unit 70 determines whether or not the current timing falls into the terminal-side wait period.

The terminal-side-wait-period setting unit 70 updates the terminal wait time in the case where the terminal-side wait-period flag is on (YES in S115) (S116). Here, the timer value of a timer for measuring the terminal wait time is decremented as time elapses. Then, when the updated terminal wait time becomes zero, i.e., after the elapse of the set terminal wait time (YES in S117), the terminal-side-wait-period setting unit 70 turns off the terminal-side wait-period flag (S118). Note that the terminal wait time is set in a manner that will be described later in detail. Here, the period from when the terminal wait time is set to the elapse of the terminal wait time serves as the terminal-side wait period.

Furthermore, the case where a terminal-side wait period is set refers to the case where the screen-reload selecting part 30b is tapped while an animation is being displayed. In this case, since the animation is forcibly terminated when a battle screen is redisplayed, the animation flag is necessarily off. Furthermore, during the terminal-side wait period, since the start of actions is restricted, the displaying of an animation, such as an ability animation, is not started. Therefore, the terminal-side wait-period flag and the animation flag are not simultaneously on.

Furthermore, as described earlier, in the reservation-disabled state, since actions are not reserved, a terminal-side wait period is not set at the player terminal 1. In the reservation-disabled state, the proceeding of the game is controlled on the basis of the server-side wait period managed at the server 100. Therefore, in the reservation-disabled state (NO in S104), in the case where action identification information is transmitted to the server 100 (NO in S112 and S113), the terminal-side wait-period flag is necessarily off (NO in S115).

When an animation is not being displayed (NO in S107 and NO in S112) and in the case where the current timing does not fall into the terminal-side wait period (NO in S115), processing in S120 to S135 in FIG. 13 is executed. Meanwhile, when an animation is being displayed (YES in S112 and YES in S107) or during the terminal-side wait period (YES in S115), the processing in S120 to S135 in FIG. 13 is not executed.

When an animation is not being displayed (NO in S107 and NO in S112) and in the case where the current timing does not fall into the terminal-side wait period (NO in S115), the terminal-side transmission unit 60 determines whether or not action identification information is stored in the action reservation area (S120). Note that it is determined that action identification information is stored in S120 in the case where the state is set to the reservation-enabled state and an action has been reserved. That is, in the case where the state is set to the reservation-disabled state, action identification information is not stored, and the determination in S120 necessarily results in NO.

If action identification information is stored (YES in S120), the terminal-side transmission unit 60 shifts the action identification information (S121). Here, the action identification information stored in the first to N-th storage units is shifted to the zeroth to (N−1)-th storage units, i.e., to the storage units having numbers that are less by one.

The terminal-side transmission unit 60 transmits the action identification information shifted to the zeroth storage unit to the server 100 (S122). Furthermore, the timer management unit 68 sets a reception wait time to a timer (S123).

Furthermore, suppose that action identification information is not stored (NO in S120) and that rendering information is received from the server 100 (YES in S125) while waiting for reception (YES in S124). In this case, the parameter update unit 72 updates parameters on the basis of the rendering information (S126). Furthermore, the display control unit 64 starts displaying an animation on the basis of the received rendering information (S127), and turns on the animation flag (S128). Furthermore, the timer management unit 68 resets the timer for measuring the reception wait time (S129).

Furthermore, suppose that server waiting information is received from the server 100 (NO in S125 and YES in S130) while waiting for reception (YES in S124). In this case, the display control unit 64 displays a wait image 52 on the display 26 (S131). Furthermore, the timer management unit 68 resets the timer for measuring the reception wait time (S132).

Furthermore, either rendering information or server waiting information is not received (NO in S125 and NO in S130) while waiting for reception (YES in S124), the timer management unit 68 updates the reception wait time (decrements the timer value) (S133). Then, when the timer value becomes zero, resulting in a time over (YES in S134), the error processing unit 74 executes prescribed error processing (S135).

Furthermore, when the screen-reload selecting part 30b is tapped while executing the terminal-side battle-game execution process (YES in S136), the page reloading process (S200) described earlier is executed. Furthermore, if the screen-reload selecting part 30b is not tapped (NO in S136) and if a termination condition for the battle game is not satisfied (NO in S137), the individual processing steps are repeated, starting from the display switch processing (S102). That is, the page reloading process (S200) is executed when a battle game is started, and is not subsequently executed again unless the screen-reload selecting part 30b is tapped.

Note that when the termination condition for the battle game is satisfied (YES in S137), prescribed termination processing is executed (S138), and the battle game, i.e., the terminal-side battle-game execution process, is terminated.

Figure 14:
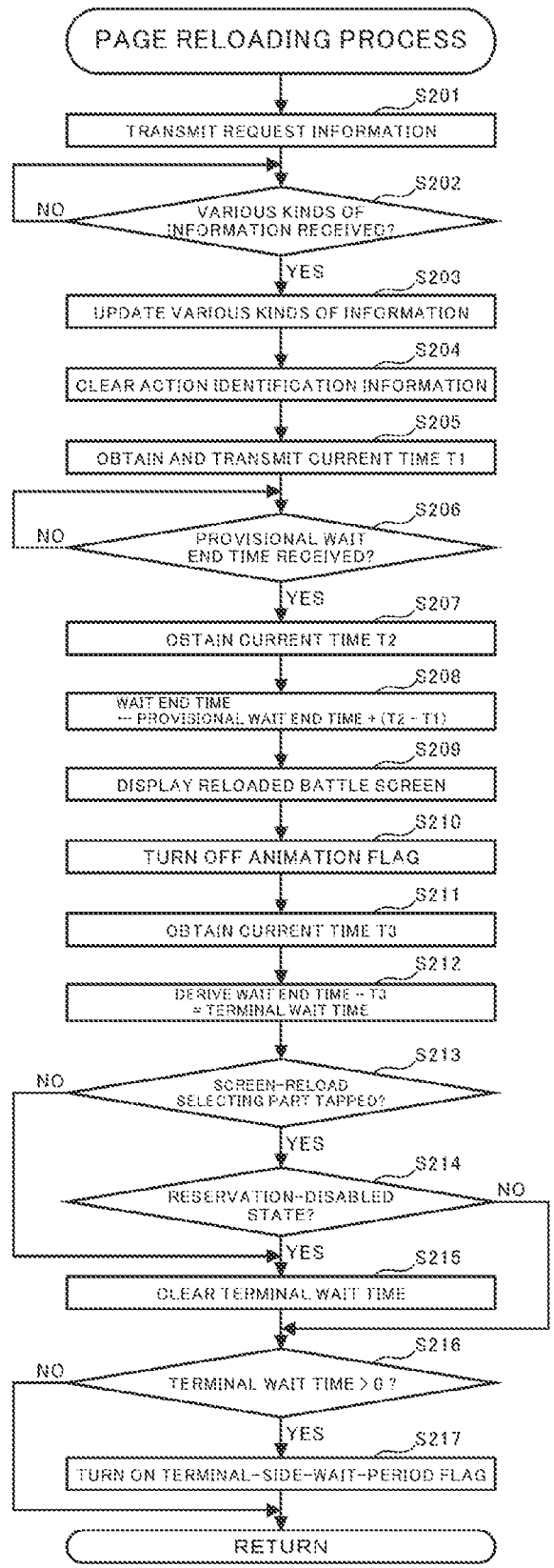
FIG. 14 is a flowchart for explaining an example page reloading process at the player terminal.

FIG. 14 is a flowchart for explaining an example page reloading process (S200) at the player terminal 1. The reload unit 62 transmits request information to the server 100 (S201), and waits for the reception of various kinds of information including parameter values and rendering information (S202). Upon receiving the various kinds of information (YES in S202), the reload unit 62 updates various kinds of information at the player terminal 1 (S203), and clears all the action identification information stored in the zeroth to N-th storage units of the action reservation area (S204).

The terminal-side-wait-period setting unit 70 obtains the current time T1 and transmits the current time T1 to the server 100 (S205). As will be described later in detail, the server 100 obtains and sets a provisional wait end time upon receiving the current time T1 from the player terminal 1.

Upon receiving the provisional wait end time (YES in S206), the terminal-side-wait-period setting unit 70 obtains the current time T2 at the timing when the provisional wait end time was received (S207). Then, the terminal-side-wait-period setting unit 70 adds the difference between the current times T2 and T1 to the received provisional wait end time to calculate and store a wait end time (S208).

The display control unit 64 displays a reloaded battle screen on the basis of the received various kinds of information (rendering information) (S209). Furthermore, the display control unit 64 turns off the animation flag (S210).

Furthermore, the terminal-side-wait-period setting unit 70 obtains the current time T3 at the time when the displaying of a reloaded battle screen was completed (S211). The terminal-side-wait-period setting unit 70 derives and stores a terminal wait time obtained by subtracting the current time T3 from the wait end time stored in S208 described above (S212).

Furthermore, in the case where the screen-reload selecting part 30*b* is tapped but the page reloading process is not performed during the battle game (NO in S213), i.e., in the case where the page reloading process is executed when the battle game is started, the terminal-side-wait-period setting unit 70 clears (to zero) the terminal wait time stored in S212 described above (S215). Furthermore, also in the case where the screen-reload selecting part 30*b* is tapped and the page reloading process is executed during the battle game (YES in S213) and the state is set to the reservation-disabled state (YES in S214), the terminal-side-wait-period setting unit 70 clears the terminal wait time stored in S212 described above (S215).

In the case where the terminal wait time stored in the end is greater than zero (YES in S216), i.e., in the case where a terminal wait time is set in the end in the page reloading process, the terminal-side-wait-period setting unit 70 turns on the terminal-side wait-period flag (S217). This concludes the page reloading process, and the process is subsequently resumed from S102.

With the page reloading process described above, a terminal-side wait period (terminal wait time) is set at the player terminal 1 only in the case where the state is set to the reservation-enabled state. Therefore, in the case where the state is set to the reservation-disabled state, even if an action icon is tapped immediately after the screen-reload selecting part 30*b* is tapped, action identification information is transmitted to the server 100. In this case, however, server waiting information is received from the server 100, and a wait image 52 is displayed.

Furthermore, the terminal-side wait period is determined in consideration of the difference between the current times T1 and T2. Thus, the communication time between the player terminal 1 and the server 100 is appropriately reflected in the terminal-side wait period.

(Specific Processing at Server 100)

Figure 15:
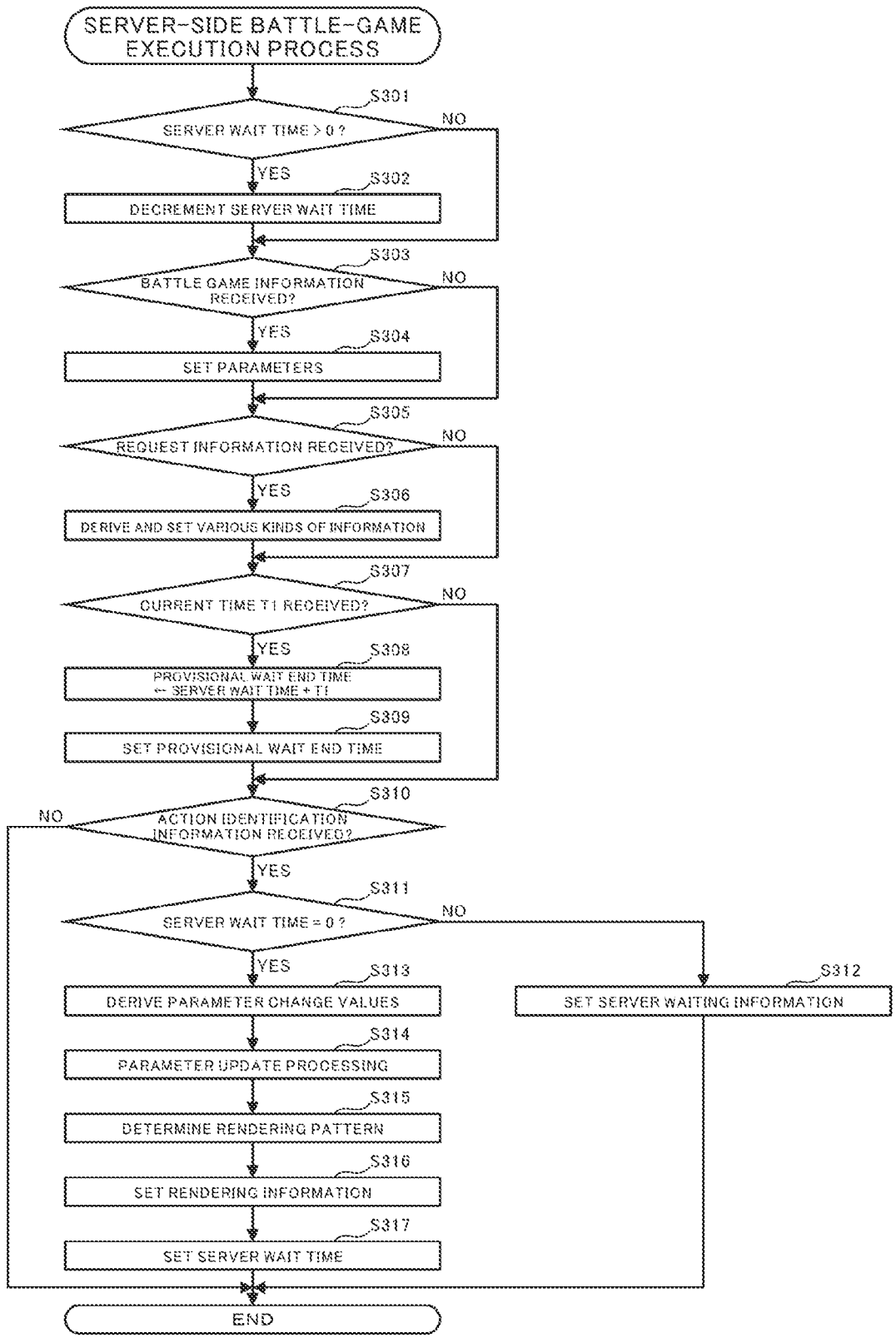
FIG. 15 is a flowchart for explaining an example server-side battle-game execution process at the server.

FIG. 15 is a flowchart for explaining an example server-side battle-game execution process at the server 100. The server-side battle-game execution process is repeated every prescribed time (e.g., a few milliseconds to a few tens of milliseconds).

The server-side-wait-period setting unit 130 decrements the server wait time set to a timer (S302) in the case where the server wait time is not zero (YES in S301). Note that the state in which the server wait time is not zero falls into the server-side wait period, and the state in which the server wait time is zero does not fall into the server-side wait period.

Upon receiving battle game information (YES in S303), the computation unit 132 sets parameter values of the individual parameters in the processing area on the basis of the received battle game information (S304). Furthermore, upon receiving request information (YES in S305), the information output unit 134 derives the parameter values, etc. stored in the processing area and sets various kinds of information so that the player terminal 1 can receive the information (S306). The various kinds of information set here are received by the player terminal 1.

Furthermore, upon receiving the current time T1 from the player terminal 1 (YES in S307), the server-side-wait-period setting unit 130 adds the current timer value of the timer, i.e., the server wait time, to the received current time T1 to derive a provisional wait end time (S308). Then, the server-side-wait-period setting unit 130 sets the derived provisional wait end time so that the player terminal 1 can receive the provisional wait end time (S309).

Furthermore, when action identification information is received (YES in S310), if the server wait time is not zero (NO in S311), i.e., if the current timing falls into the server-side wait period, the waiting-information setting unit 136 sets server waiting information so that the player terminal 1 can receive the server waiting information.

Meanwhile, when action identification information is received (YES in S310), if the server wait time is zero (YES in S311), i.e., if the current timing does not fall into the server-side wait period, the computation unit 132 derives change values of the parameters (S313). Here, for example, a damage value given to an ally character or the enemy character is determined. Furthermore, the computation unit 132 executes update processing for updating the parameter values, for example, by adding the derived change values to the parameter values currently stored in the processing area (S314). Furthermore, the rendering-information setting unit 138 determines a rendering pattern (rendering information) on the basis of the received action identification information (S315), and sets the rendering information so that the player terminal 1 can receive the rendering information (S316).

Furthermore, the server-side-wait-period setting unit 130 sets a server wait time to a timer on the basis of the received action identification information (S317). Note that the server wait time is preset for each item of action identification information. However, action identification information includes items for which a plurality of rendering patterns are provided and items for which only a single rendering pattern is provided. As an example, in the case where an item of action identification information for which only a single rendering pattern is provided is received, the same rendering pattern is always determined. In this case, there is only one server wait time preset for the action identification information and the rendering pattern.

As another example, in the case where a normal attack action is executed, different rendering patterns are determined in accordance with damages given to the enemy character. Furthermore, the number of esoteric attack moves varies depending on the number of ally characters whose meter values have reached the maximum value when the normal attack icon 42 is tapped. As described above, different rendering patterns, i.e., animations with different rendering times, may be determined depending on the game situation. That is, action identification information for which a plurality of rendering patterns are provided has a plurality of server wait times set therefor. Therefore, depending on the kind of action identification information, a server wait time can be set on the basis of rendering information (rendering pattern). As described above, the server-side-wait-period setting unit 130 sets a server-side wait period at least on the basis of action identification information or rendering information.

Note that the server wait period is set to be longer as the rendering time of an animation becomes longer. Furthermore, the server wait periods are set to be shorter than the display times of animations for all actions. However, the server wait periods may be set uniformly for each kind of action, irrespective of the rendering times of animations. Furthermore, for example, the setting of a server wait time may be omitted in the case where the rendering time of an animation is short.

Furthermore, in the server-side battle-game execution process described above, action identification information is received during the server-side wait period (YES in S310 and NO in S311) only in the case where the state is set to the reservation-disabled state. This is because in the case where the state is set to the reservation-enabled state, a terminal-side wait period is set at the player terminal 1, and action identification information is not transmitted to the server 100 during this period.

According to this embodiment, the setting and management of wait periods are shared between the player terminal 1 and the server 100, as described above. Thus, wait periods are set appropriately, which serves to alleviate stress that the player experiences.

Although an aspect of an embodiment has been described above with reference to the accompanying drawings, it goes without saying that the present invention is not limited to the embodiment described above. It would be obvious that a person skilled in the art could conceive of various kinds of modifications or improvements within the scope recited in the claims, and it would be understood that those modifications and improvements obviously fall within the technical scope.

The above-described embodiment has been described in the context of the case where the player can set the reservation-enabled state and the reservation-disabled state as the reservation state. However, for example, either the reservation-enabled state or the reservation-disabled state described above may be provided only. In the case where there is only one reservation state, the setting and management of wait periods may be performed either at the player terminal 1 or the server 100 only.

Furthermore, in the embodiment described above, in the case where the state is set to the reservation-enabled state, the proceeding of the game is controlled on the basis of the terminal-side wait period. Meanwhile, in the case where the state is set to the reservation-disabled state, the proceeding of the game is controlled on the basis of the server-side wait period. Conversely, however, for example, the proceeding of the game may be controlled on the basis of the server-side wait period in the case where the state is set to the reservation-enabled state, and the proceeding of the game may be controlled on the basis of the terminal-side wait period in the case where the state is set to the reservation-disabled state.

Furthermore, the content, number, etc. of actions described in the context of the embodiment described above are merely examples. Furthermore, in the embodiment described above, a single turn is constituted of a special action segment and a normal attack segment, and the player is allowed to select individual actions in the special action segment. However, the method of proceeding with a battle game is not limited to the above; for example, the player may be allowed to select actions also in the normal attack segment in the embodiment described above.

Furthermore, in the embodiment described above, in the case where the state is set to the reservation-disabled state, a wait image 52 is displayed when an ability icon 48 is tapped during the server-side wait period. However, the displaying of the wait image 52 is not necessary unless parameter values are updated or various kinds of computation are executed at the server 100 during the server-side wait period.

Furthermore, in the embodiment described above, a terminal-side wait period is set in the case where the state is set to the reservation-enabled state. However, for example, a terminal-side wait period may also be set in the case where the state is set to the reservation-disabled state. In the case where an ability icon 48 is tapped during the terminal-side wait period in the reservation-disabled state, similarly to the case of the reservation-enabled state described above, the transmission processing for transmitting action identification information to the server 100 may be skipped.

Furthermore, in the embodiment described above, suppose, for example, that when action identification information is received, the server-side wait period is set to six seconds, and a twelve-second animation is displayed at the player terminal 1. Furthermore, suppose that the screen-reload selecting part 30b is tapped one second after the start of displaying of the animation. In this case, the remaining server wait time is five seconds, and the terminal-side wait period is set on the basis of the five seconds.

That is, in the embodiment described above, the terminal-side wait period reflects the time for which an animation has been displayed, in other words, the time from the start of displaying of an animation to tapping of the screen-reload selecting part 30b. Therefore, in the above example, in the case where the screen-reload selecting part 30b is tapped after six seconds from the start of displaying of the animation, the terminal wait time is zero seconds, so that a terminal-side wait period is not set.

By setting the terminal-side wait period on the basis of the server-side wait period, as described above, the need for performing time management at both the player terminal 1 and the server 100 is eliminated. Alternatively, for example, the terminal-side wait period may be set at the player terminal 1 separately from the server-side wait period.

Furthermore, the above-described embodiment has been described in the context of the case where the screen-reload selecting part 30b is tapped as an example of the case where a specific operation is input. However, specific operations include a wide range of operations with which a transition from a battle screen to another screen occurs, such as the case where the previous-screen selecting part 30a or the my-page selecting part 30c is tapped. For example, also in the case where the previous-screen selecting part 30a or the my-page selecting part 30c is tapped during a battle game and then the quest icon 32 is tapped again to start the battle game, it is assumed that a specific operation has been performed, and processing similar to the case where the screen-reload selecting part 30b is tapped is executed.

Furthermore, as described earlier, when action identification information is transmitted from the player terminal 1 to the server 100 during the server-side wait period, a wait image 52 is displayed on the display 26. At this time, in the case where the wait image 52 is displayed a prescribed number of times or more, the server-side wait period may be extended as a penalty.

Note that the programs for executing the processing in the embodiment described above may be stored in a computer-readable storage medium and may be provided in the form of the storage medium. Furthermore, the programs may also be provided in the form of a game terminal device including the storage medium. Furthermore, the embodiment described above may be embodied as an information processing method for realizing the individual functions and the steps shown in the flowcharts.

What is claimed is:

1. An information processing system comprising a player terminal and a server, wherein the player terminal is configured to execute:
transmission processing for transmitting action identification information corresponding to a selected action to the server on the basis of an input of a selecting operation for selecting one of a plurality of actions,
the server is configured to execute:
update processing for updating a parameter at least on the basis of the action identification information; and
setting rendering information at least on the basis of the action identification information,
the player terminal is further configured to execute:
displaying an action image on a display on the basis of the rendering information; and
setting a terminal-side wait period on the basis of an input of a specific operation, and wherein the player terminal does not execute the transmission processing during the terminal-side wait period, and
wherein the player terminal is further configured to execute:
accumulating the action identification information corresponding to the selected action when the selecting operation is input during the terminal-side wait period, and
transmitting the accumulated action identification information to the server in the transmission processing.

2. The information processing system according to claim 1, wherein the server is further configured to execute:
setting a server-side wait period at least on the basis of the action identification information or the rendering information, and
the player terminal sets the terminal-side wait period on the basis of the server-side wait period when the specific operation is input.

3. An information processing system comprising a player terminal and a server,
wherein the player terminal is configured to execute:
transmitting action identification information corresponding to a selected action to a server on the basis of an input of a selecting operation for selecting one of a plurality of actions,
the server is configured to execute:
setting rendering information at least on the basis of the action identification information;
the player terminal is further configured to execute:
displaying an action image on a display on the basis of the rendering information, and
setting a terminal-side wait period on the basis of an input of a specific operation,
the server is further configured to execute:
setting a server-side wait period at least on the basis of the action identification information or the rendering information; and
update processing for updating a parameter at least on the basis of the action identification information when the action identification information is received not during the server-side wait period,
wherein the server does not execute the update processing when the action identification information is received during the server-side wait period, and
wherein the player terminal is further configured to execute:
accumulating the action identification information corresponding to the selected action when the selecting operation is input during the terminal-side wait period, and
transmitting the accumulated action identification information to the server during transmitting the action identification information.

4. The information processing system according to claim 3,
wherein the server is further configured to execute:
setting server waiting information when the action identification information is received during the server-side wait period, and
the player terminal is further configured to execute:
displaying a wait image on the display when the server waiting information is received.

5. An information processing method comprising steps of:
executing transmission processing at a player terminal for transmitting action identification information corresponding to a selected action to a server on the basis of an input of a selecting operation for selecting one of a plurality of actions;
executing update processing at the server for updating a parameter at least on the basis of the action identification information;
setting rendering information at the server at least on the basis of the action identification information;
displaying an action image on a display at the player terminal on the basis of the rendering information; and
setting a terminal-side wait period at the player terminal on the basis of an input of a specific operation,
wherein the transmission processing is not executed during the terminal-side wait period;
accumulating, by the player terminal, the action identification information corresponding to the selected action when the selecting operation is input during the terminal-side wait period; and
transmitting, by the player terminal, the accumulated action identification information to the server in the transmission processing.

6. An information processing method comprising steps of:
transmitting action identification information corresponding to a selected action from a player terminal to a server on the basis of an input of a selecting operation for selecting one of a plurality of actions;
setting rendering information at the server at least on the basis of the action identification information;
displaying an action image on a display at the player terminal on the basis of the rendering information;
setting a server-side wait period at the server at least on the basis of the action identification information or the rendering information;
executing update processing at the server for updating a parameter at least on the basis of the action identification information when the action identification information is received not during the server-side wait period,
wherein the update processing is not executed when the action identification information is received during the server-side wait period;
setting a terminal-side wait period at the player terminal on the basis of an input of a specific operation;
accumulating, by the player terminal, the action identification information corresponding to the selected action when the selecting operation is input during the terminal-side wait period; and
transmitting, by the player terminal, the accumulated action identification information to the server during transmitting the action identification information.

* * * * *